US012659487B2

(12) United States Patent
Lin et al.

(10) Patent No.: US 12,659,487 B2
(45) Date of Patent: Jun. 16, 2026

(54) METHODS AND APPARATUSES OF VIDEO PROCESSING WITH MOTION REFINEMENT AND SUB-PARTITION BASE PADDING

(71) Applicant: HFI Innovation Inc., Zhubei City (TW)

(72) Inventors: Yu-Cheng Lin, Hsinchu City (TW); Chun-Chia Chen, Hsinchu City (TW); Chih-Wei Hsu, Hsinchu City (TW); Ching-Yeh Chen, Hsinchu City (TW); Tzu-Der Chuang, Hsinchu City (TW); Yu-Wen Huang, Hsinchu City (TW)

(73) Assignee: HFI INNOVATION INC., Zhubei City (TW)

( * ) Notice: Subject to any disclaimer, the term of this patent is extended or adjusted under 35 U.S.C. 154(b) by 0 days.

(21) Appl. No.: 18/616,776

(22) Filed: Mar. 26, 2024

(65) Prior Publication Data

US 2024/0236329 A1      Jul. 11, 2024

Related U.S. Application Data

(63) Continuation of application No. 17/437,148, filed as application No. PCT/CN2020/079288 on Mar. 13, 2020, now Pat. No. 11,985,324.
(Continued)

(51) Int. Cl.
*H04N 19/137*      (2014.01)
*H04N 19/105*      (2014.01)
(Continued)

(52) U.S. Cl.
CPC ......... *H04N 19/137* (2014.11); *H04N 19/105* (2014.11); *H04N 19/132* (2014.11);
(Continued)

(58) Field of Classification Search
CPC .. H04N 19/137; H04N 19/105; H04N 19/132; H04N 19/159; H04N 19/176;
(Continued)

(56) References Cited

U.S. PATENT DOCUMENTS 8,774,282 B2      7/2014  Song
8,891,608 B2     11/2014  Lin et al.
(Continued)

FOREIGN PATENT DOCUMENTS

CN        101193302 A      6/2008
CN        105379288 A      3/2016
(Continued)

OTHER PUBLICATIONS

Chun-Chi Chen, CE9: Removal of 4xN/8x8 CUs and Boundary Padding Process from DMVR (Test 9.1.1), Mar. 2019, Joint Video Experts Team (JVET) (Year: 2019).*
(Continued)

*Primary Examiner* — Hesham K Abouzahra
(74) *Attorney, Agent, or Firm* — McClure, Qualey & Rodack, LLP

(57)                    ABSTRACT

Exemplary video processing methods and apparatuses for encoding or decoding a current block by inter prediction are disclosed. Input data of a current block is received and partitioned into sub-partitions and motion refinement is independently performed on each sub-partition. A reference block for each sub-partition is obtained from one or more reference pictures according to an initial motion vector (MV). A refined MV for each sub-partition is derived by searching around the initial MV with N-pixel refinement. One or more boundary pixels of the reference block for a sub-partition is padded for motion compensation of the sub-partition. A final predictor for the current block is generated by performing motion compensation for each
(Continued)

sub-partition according to its refined MV. The current block is then encoded or decoded according to the final predictor.

21 Claims, 13 Drawing Sheets

Related U.S. Application Data

(60) Provisional application No. 62/818,171, filed on Mar. 14, 2019.

(51) Int. Cl.
*H04N 19/132* (2014.01)
*H04N 19/159* (2014.01)
*H04N 19/176* (2014.01)
*H04N 19/513* (2014.01)

(52) U.S. Cl.
CPC ......... *H04N 19/159* (2014.11); *H04N 19/176* (2014.11); *H04N 19/513* (2014.11)

(58) Field of Classification Search
CPC ...... H04N 19/513; H04N 19/52; H04N 19/56; H04N 19/57; H04N 19/577; H04N 19/563; H04N 19/523
See application file for complete search history.

(56) References Cited

U.S. PATENT DOCUMENTS

| | | | |
|---|---|---|---|
| 9,860,529 B2 | 1/2018 | Zhang et al. | |
| 10,200,688 B2 | 2/2019 | Ikai | |
| 10,477,231 B2 | 11/2019 | Lim et al. | |
| 10,880,570 B2 | 12/2020 | Chuang et al. | |
| 10,999,595 B2 | 5/2021 | Lin et al. | |
| 2008/0170629 A1 | 7/2008 | Shim et al. | |
| 2009/0323798 A1 | 12/2009 | He et al. | |
| 2010/0322184 A1 | 12/2010 | Xiao | |
| 2011/0110429 A1 | 5/2011 | La et al. | |
| 2012/0027097 A1 | 2/2012 | Lin et al. | |
| 2012/0102154 A1 | 4/2012 | Huang et al. | |
| 2013/0301727 A1 | 11/2013 | Huang et al. | |
| 2014/0072055 A1 | 3/2014 | Sato | |
| 2014/0192862 A1 | 7/2014 | Flynn | |
| 2015/0326881 A1 | 11/2015 | Ikai et al. | |
| 2016/0171293 A1 | 6/2016 | Li | |
| 2016/0234495 A1 | 8/2016 | Wennersten | |
| 2016/0335752 A1 | 11/2016 | Lim et al. | |
| 2016/0366415 A1 | 12/2016 | Liu et al. | |
| 2017/0013270 A1 | 1/2017 | Okajima | |
| 2017/0150186 A1 | 5/2017 | Zhang et al. | |
| 2017/0155911 A1 | 6/2017 | Lin et al. | |
| 2017/0280162 A1 | 9/2017 | Zhao et al. | |
| 2017/0332099 A1 | 11/2017 | Lee et al. | |
| 2018/0098079 A1 | 4/2018 | Chuang et al. | |
| 2018/0176592 A1 | 6/2018 | Lim et al. | |
| 2018/0184117 A1 | 6/2018 | Chen et al. | |
| 2018/0192072 A1 | 7/2018 | Chen et al. | |
| 2018/0241998 A1 | 8/2018 | Chen et al. | |
| 2018/0249172 A1 | 8/2018 | Chen | |
| 2018/0262773 A1 | 9/2018 | Chuang et al. | |
| 2018/0374220 A1 | 12/2018 | Seo | |
| 2019/0075328 A1 | 3/2019 | Huang | |
| 2019/0182505 A1 | 6/2019 | Chuang et al. | |
| 2019/0230364 A1 | 7/2019 | Lee et al. | |
| 2019/0281294 A1 | 9/2019 | Kim | |
| 2019/0297325 A1 | 9/2019 | Lim | |
| 2020/0007888 A1* | 1/2020 | Xu | H04N 19/44 |
| 2020/0177911 A1 | 6/2020 | Aono et al. | |
| 2020/0267408 A1 | 8/2020 | Lee | |
| 2021/0127133 A1 | 4/2021 | Chen | |
| 2021/0144392 A1* | 5/2021 | Zhang | H04N 19/107 |
| 2021/0266530 A1* | 8/2021 | Liu | H04N 19/137 |
| 2022/0116621 A1* | 4/2022 | Urban | H04N 19/577 |

FOREIGN PATENT DOCUMENTS

| | | | | |
|---|---|---|---|---|
| CN | 105393534 A | 3/2016 | | |
| CN | 106797475 A | 5/2017 | | |
| CN | 107710764 A | 2/2018 | | |
| CN | 107810635 A | 3/2018 | | |
| CN | 107925775 A | 4/2018 | | |
| CN | 108293131 A | 7/2018 | | |
| JP | 2003-219417 A | 7/2003 | | |
| WO | 2017157249 A1 | 9/2017 | | |
| WO | 2018062892 A1 | 4/2018 | | |
| WO | 2018/121506 A1 | 7/2018 | | |
| WO | 2018/130206 A1 | 7/2018 | | |
| WO | 2019/001737 A1 | 1/2019 | | |
| WO | 2019/007766 A1 | 1/2019 | | |
| WO | WO-2019089382 A1 * | 5/2019 | | H04N 19/563 |

OTHER PUBLICATIONS

International Search Report and Written Opinion dated May 27, 2020, issued in application No. PCT/CN2020/079288.

Xiu, X., et al.; "CE9-related: A simplified design of bi-directional optical flow (BIO);" Joint Video Experts Team (JVET) of ITU-T SG 16 WP 3 and ISO/IEC JTC 1/SC 29/WG 11; Oct. 2018; pp. 1-25.

Chinese language office action dated Apr. 28, 2021, issued in application No. TW 109108461.

Partial Supplementary European Search Report dated Oct. 7, 2022, issued in application No. EP 20769669.1.

Chen, C., et al.; "CE9: Removal of 4xN/8x8 CUs and Boundary Padding Process from DMVR (Test 9.1.1);" Joint Video Experts Team (JVET) of ITU-T SG 16 WP 3 and ISO/IEC JTC 1/SC 29/WG 11; Mar. 2019; pp. 1-7.

Hsu, C., et al.; "Description of SDR video coding technology proposal by MediaTek;" Joint Video Experts Team (JVET) of ITU-T SG 16 WP 3 and ISO/IEC JTC 1/SC 29/WG 11; Apr. 2018; pp. 1-64.

International Search Report and Written Opinion dated Jun. 27, 2019, issued in application No. PCT/CN2019/085043.

Chinese language office action dated Jul. 9, 2020, issued in application No. TW 108115036.

B. Choi, J. Han, C. Kim and S. Ko, "Motion-Compensated Frame Interpolation Using Bilateral Motion Estimation and Adaptive Overlapped Block Motion Compensation," in IEEE Transactions on Circuits and Systems for Video Technology, vol. 17, No. 4, pp. 407-416, Apr. 2007, doi: 10.11 09/TCSVT.2007.893835.

Non-Final Office Action dated Dec. 22, 2022, issued in U.S. Appl. No. 17/723,923 (copy not provided).

Chinese language office action dated Feb. 11, 2023, issued in application No. CN 201980028800.5.

Chinese language office action dated Apr. 22, 2023, issued in application No. CN 202080019830.2.

Final Office Action dated Jun. 12, 2023, issued in U.S. Appl. No. 17/723,923 (copy not provided).

Non-Final Office Action dated Oct. 24, 2023, issued in U.S. Appl. No. 17/723,923.

Chinese language office action dated Dec. 23, 2023, issued in application No. 202080019830.2.

Non-Final Office Action dated Dec. 29, 2023, issued in U.S. Appl. No. 17/723,923 (copy not provided).

Final Office Action dated Jul. 1, 2024, issued in U.S. Appl. No. 17/723,923 (copy not provided).

* cited by examiner

Ref Idx = 1          Ref Idx = 0          Current
                                          picture Reference picture
in L0

Current
picture

Reference picture
in L1

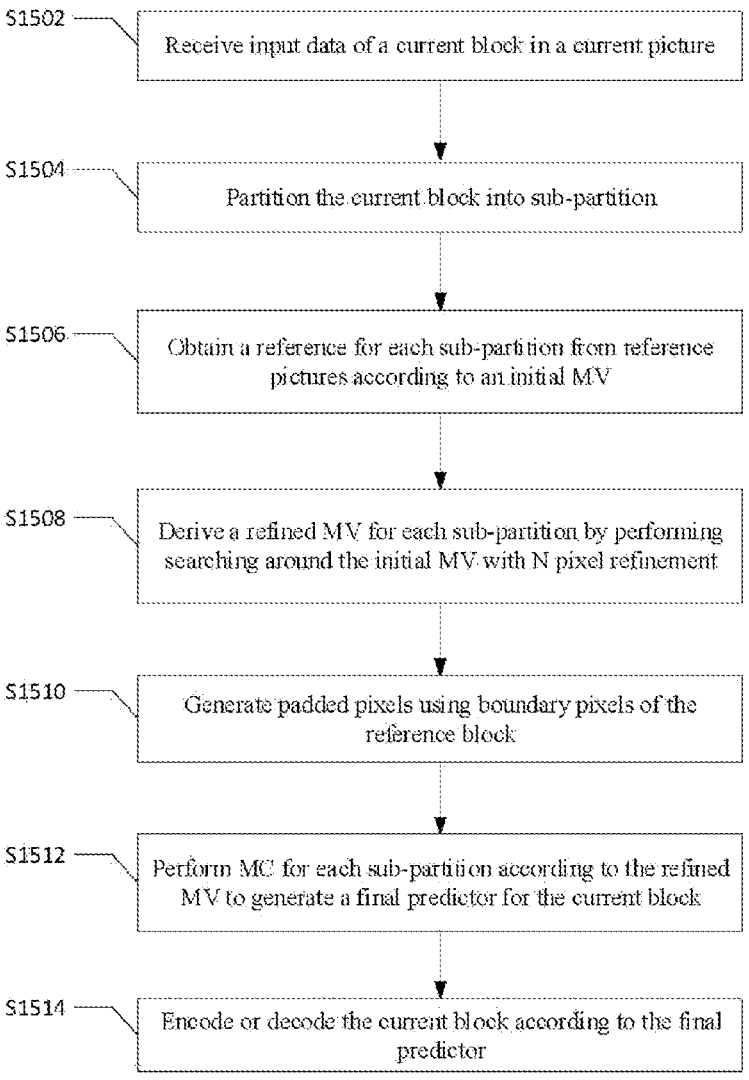

S1502 — Receive input data of a current block in a current picture

S1504 — Partition the current block into sub-partition

S1506 — Obtain a reference for each sub-partition from reference pictures according to an initial MV S1508 — Derive a refined MV for each sub-partition by performing searching around the initial MV with N pixel refinement S1510 — Generate padded pixels using boundary pixels of the reference block S1512 — Perform MC for each sub-partition according to the refined MV to generate a final predictor for the current block S1514 — Encode or decode the current block according to the final predictor

METHODS AND APPARATUSES OF VIDEO PROCESSING WITH MOTION REFINEMENT AND SUB-PARTITION BASE PADDING

CROSS REFERENCE TO RELATED APPLICATION

The present invention is a Continuation of pending U.S. Utility patent application Ser. No. 17/437,148, filed on Sep. 8, 2021, which is a 371 National Phase of PCT Application No. PCT/CN2020/079288, filed on Mar. 13, 2020, which claims priority to U.S. Provisional Patent Application, Ser. No. 62/818,171, filed on Mar. 14, 2019, entitled "New Methods for MV Refinement about Padding Modification". The applications are hereby incorporated by reference in its entirety.

FIELD OF THE INVENTION

The present invention relates to video processing methods and apparatuses in video encoding and decoding systems. In particular, the present invention relates to encode or decode video data by inter prediction with motion refinement.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard improves the video compression performance of its proceeding standard H.264/AVC to meet the demand for higher picture resolutions, higher frame rates, and better video qualities.

Skip and Merge Skip and Merge modes in the HEVC standard increase the coding efficiency of Motion Vectors (MVs) as motion information is inherited from a spatially or temporally collocated block. To code a block in Skip or Merge mode, instead of signaling motion information, only a Merge index representing a final Merge candidate selected from a candidate list is signaled. The motion information reused by the block coded in Skip or Merge mode includes a MV, prediction direction, and reference picture index of the selected final candidate. It is noted that if the selected final candidate is a temporal motion candidate, the reference picture index is always set to zero. Prediction residual is coded when the block is coded in Merge mode, however, the Skip mode further skips signaling of the prediction residual as the residual data of a block coded in Skip mode is forced to be zero.

FIG. 1 illustrates a Merge candidate list constructed for a current Prediction Unit (PU) 10 coded in Skip or Merge mode in HM-4.0 in the HEVC standard. The Merge candidate list consists of four spatial motion candidates associated with neighboring blocks of the current PU 10 and one temporal motion candidate associated with a collocated PU 12 of the current PU 10. As shown in FIG. 1, the first Merge candidate is a left predictor $A_1$ 112, the second Merge candidate is a top predictor $B_1$ 114, the third Merge candidate is a right above predictor $B_0$ 113, and a fourth Merge candidate is a left below predictor $A_0$ 111. A left above predictor $B_2$ 115 is included in the Merge candidate list to replace an unavailable spatial predictor. A fifth Merge candidate is a temporal predictor of first available temporal predictors $T_{BR}$ 121 and $T_{CTR}$ 122. After deriving the four spatial motion candidates and one temporal motion candidate, a pruning process is applied to remove any redundant motion candidate. After the pruning process, three types of additional candidates are derived and added to the candidate list if the number of available motion candidates is smaller than five. The encoder selects one final candidate from the candidate list for each PU coded in Skip or Merge mode based on motion vector competition such as through a Rate-Distortion Optimization (RDO) decision, and an index representing the selected final candidate is signaled to the decoder. The decoder selects the same final candidate from the candidate list according to the index transmitted in the video bitstream. Since the derivations of Skip and Merge candidates are similar, the "Merge" mode referred hereafter may correspond to Merge mode as well as Skip mode for convenience.

In the up-coming video coding standard Versatile Video Coding (VVC), a number of refined inter prediction coding tools were proposed to improve inter prediction coding efficiency. The refined inter prediction coding tools include extended merge prediction, Merge Mode with Motion Vector Difference (MMVD), AMVP mode with symmetric MVD signaling, affine motion compensated prediction, Sub-block-based Temporal Motion Vector Prediction (SbTMVP), Adaptive Motion Vector Resolution (AMVR), motion field storage such as $\frac{1}{16}^{th}$ luma sample MV storage and 8×8 motion field compression, Bi-prediction with Weighted Average (BWA), Bi-Directional Optical Flow (BDOF), Decoder side Motion Vector Refinement (DMVR), triangle partition prediction, Combined Inter and Intra Prediction.

Extended Merge Prediction The Merge candidate list is constructed by including the following five types of candidates: spatial Motion Vector Predictor (MVP) from spatial neighboring Coding Units (CUs), temporal MVP from collocated CUs, history-based MVP from a First In First Out (FIFO) table, pairwise average MVP, and zero MVs. The size of the Merge candidate list is signaled in a slice header and a maximum allowed size of the Merge candidate list is 6 in VVC Test Model 4 (VTM4). For each CU coded in Merge mode, a Merge index of the best Merge candidate is encoded using Truncated Unary (TU) binarization. The first bin of the Merge index is coded with context coding and the remaining bins of the Merge index is coded with bypass coding. The derivation of spatial Merge candidates in the VVC standard is the same as that of in the HEVC standard. A maximum of four Merge candidates are selected among candidates located in the positions depicted in FIG. 1, and the order of derivation is $A_1$, $B_1$, $B_0$, $A_0$, and $B_2$. Position $B_2$ is considered only when any CU of position $A_1$, $B_1$, $B_0$, or $A_0$ is not available or is intra coded. A CU is deemed to be unavailable if it belongs to another slice or tile. After including a candidate at position $A_1$ into the Merge candidate list, each of the following candidates is subject to a redundancy check which ensures any candidate with same motion information is excluded from the Merge candidate list. To reduce computational complexity, not all possible candidate pairs are considered in the redundancy check. For example, the candidate at position $B_1$ is only compared with the candidate at position $A_1$, the candidate at position $B_0$ is only compared with Position $B_1$, the candidate at position $A_0$ is only compared with the candidate at position $A_1$, and the candidate at position $B_2$ is compared with the candidates at positions $A_1$ and $B_1$.

In the derivation of the temporal Merge candidate, a scaled motion vector is derived based on a collocated CU belonging to the collocated reference picture. The reference picture list to be used for derivation of the collocated CU is explicitly signaled in the slice header. The scaled MV for temporal Merge candidate is obtained as illustrated by the dotted line in FIG. 2, which is scaled from the MV of the collocated CU according to the Picture Order Count (POC) distances, tb and td. The POC distance tb is defined to be the POC difference between the current picture and the reference picture of the current picture. The POC distance td is defined to be the POC difference between the collocated picture and the reference picture of the collocated picture. The reference picture index of the temporal Merge candidate is set equal to zero. The position of the temporal Merge candidate is selected between $T_{BR}$ 121 and $T_{TR}$ 122 as depicted in FIG. 1. In cases when the CU at position $T_{BR}$ 121 is not available, is intra coded, or is outside of the current row of CTUs, the CU at position $T_{TR}$ 122 is used in the derivation of the temporal Merge candidate.

HMVP Merge Candidates Derivation History-based MVP (HMVP) Merge candidates are added to the Merge candidate list after the spatial and temporal MVPs. Motion information of a previously coded block is stored in a table and used as a MVP for a current CU. The table with multiple HMVP candidates is maintained during the encoding or decoding process. The table is reset to empty when a new CTU row is encountered. Associated motion information is added to the last entry of the table as a new HMVP candidate whenever there is a non-sub-block inter-coded CU. For example, a HMVP table size S is set to be 6, indicating up to 6 HMVP candidates may be added to the table. When a new motion candidate is to be inserted in the table, a constrained First In First Out (FIFO) rule is applied to perform a redundancy check. The redundancy check ensures the new motion candidate is not equal to any of the existing HMVP in the table by removing an identical HMVP from the table and moving forward all HMVP candidates stored after the identical HMVP. The HMVP candidates may be used in the Merge candidate list construction process. The latest several HMVP candidates in the table are checked in order and inserted to the Merge candidate list after the temporal MVP candidate. Redundancy check is applied to the HMVP candidates with the spatial or temporal Merge candidate. The following two simplifications are introduced to reduce the number of redundancy check operations for the HMVP candidates. First, a number of HMVP candidates used for Merge set generation is constrained as (N<=4)? M: (8−N), where N indicates a number of existing candidates in the Merge candidate list and M indicates a number of available HMVP candidates in the table. Second, the process of adding the HMVP into the Merge candidate list is terminated once a total number of Merge candidates reaches the maximally allowed Merge candidates minus 1.

Pairwise Average Merge Candidates Derivation Pairwise average candidates are generated by averaging predefined pairs of candidates in the existing Merge candidate list, and the predefined pairs are defined as {(0,1), (0, 2), (1, 2), (0, 3), (1, 3), (2, 3)}, where the numbers denote the Merge indices of the Merge candidate list. The averaged motion vectors are calculated separately for each reference picture list. In cases when both MVs are available in one reference picture list, the two MVs are averaged even when these two MVs point to different reference pictures. In cases when only one MV is available, this MV is used directly. A reference picture list is invalid if none of the MVs is available. When the Merge candidate list is not full after adding the pair-wise average Merge candidates, zero MVPs are inserted in the end of the Merge candidate list until the number of candidates reaches the maximum Merge candidate number.

Merge Mode with MVD In addition to Merge mode, Merge Mode with Motion Vector Difference (MMVD) was introduced in the VVC standard. A MMVD flag for a CU is signaled right after a Skip and Merge flag to indicate whether MMVD is used to code the CU. To code a CU using MMVD, a Merge candidate is selected for the CU, the predictor is further refined by signaling MVD information associated with the CU. The MVD information further signaled for the CU includes a Merge candidate flag, a distance index specifying motion magnitude information, and a direction index indicating the motion direction. The Merge candidate flag is signaled to specify which candidate out of the first two candidates in the Merge candidate list is selected to be used as the starting MV for MMVD. The distance index specifies motion magnitude information and indicates a predefined offset form the starting MV. FIG. 3 illustrates search points for MMVD. As shown in FIG. 3, an offset is added to either the horizontal component or vertical component of the starting MV. The relation of the distance index and the predefined offset is specified In Table 1.

TABLE 1

| The relation of the distance index and the predefined offset | | | | | | | | |
|---|---|---|---|---|---|---|---|---|
| Distance IDX | 0 | 1 | 2 | 3 | 4 | 5 | 6 | 7 |
| Offset (in unit of luma samples) | 1/4 | 1/2 | 1 | 2 | 4 | 8 | 16 | 32 |

The direction index represents the direction of the MVD relative to the starting MV. The direction index indicates one of the four directions as shown in Table 2. The meaning of the MVD sign is variable according to the information of the starting MV. For example, when the starting MV is a uni-prediction MV or bi-prediction MVs with both MVs pointing to the same side of the current picture, the sign in Table 2 specifies the sign of the MV offset added to the starting MV. When the starting MVs are bi-prediction MVs with the two MVs pointing to different sides of the current picture, the sign in Table 2 specifies the sign of the MV offset added to the list 0 MV component of the starting MV, and the sign for the list 1 MV component of the starting MV has an opposite value. Two MVs pointing to the same side of the current picture when POCs of the two reference pictures are both larger than the POC of the current picture or when POCs of the two reference pictures are both smaller than the POC of the current picture. Two MVs pointing to different sides of the current picture when the POC of one reference picture is larger than the POC of the current picture and the POC of the other reference picture is smaller than the POC of the current picture.

TABLE 2

| Sign of MV offset specified by the direction index | | | | |
|---|---|---|---|---|
| Direction IDX | 00 | 01 | 10 | 11 |
| x-axis | + | − | N/A | N/A |
| y-axis | N/A | N/A | + | − |

Decoder MV Refinement (DMVR Bilateral template MV refinement, also referred to as Decoder MV Refinement (DMVR), is applied in the Merge mode to improve the coding efficiency. DMVR works in both encoder and decoder sides and it is only applied to bi-directional prediction. The main concept of bilateral template MV refinement is to refine the MV by a motion estimation search in the Merge mode as shown in FIG. 4. For a Merge candidate having bi-prediction MVs, including a List 0 (L0) MV 442 and a List 1 (L1) MV 462, steps of bilateral template MV refinement are described in the following. In a first step of DMVR, a L0 reference block 444 pointed by the L0 MV 442 is located and a L1 reference block 464 pointed by the L1 MV 462 is located. In a second step of DMVR, a bilateral template 42 is generated by information of the L0 reference block 444 and L1 reference block 464, for example, the bilateral template 42 is calculated as an average of the L0 reference block 444 and L1 reference block 464. In a third step, the bilateral template 42 is used to perform integer motion estimation and fractional motion estimation searches around the L0 reference block 444 in a L0 reference picture 44 with a search range of P pixels×Q pixels to find a location with a minimum motion estimation cost. An embodiment of the motion estimation cost is a Sum of Absolute Difference (SAD). The final location of the minimum motion estimation cost is assigned to a refined MV of L0 446. In the third step, the bilateral template 42 is also used to perform integer motion estimation and fractional motion estimation searches around the L1 reference block 464 in a L1 reference picture 46 with a search range of P pixels×Q pixels to find a location of a minimum motion estimation cost. The final location of the minimum motion estimation cost is assigned to a refined MV of L1 466. In a fourth step, a L0 refined block 448 pointed by the refined MV of L0 446 and a L1 refined block 468 pointed by the refined MV of L1 466 are final reference blocks for a later stage, for example, these two final reference blocks 448 and 468 are used for motion compensation.

Pattern-based MV Derivation (PMVD) A Pattern-based MV Derivation (PMVD) method, also referred to as FRUC (Frame Rate Up Conversion), is a coding tool which consists of bilateral matching for bi-prediction blocks and template matching for uni-prediction blocks. A flag FRUC_mrg_flag is signaled when the Merge or Skip flag is true, and if FRUC_mrg_flag is true, a FRUC_merge_mode is signaled to indicate whether the bilateral matching Merge mode as shown in FIG. 5 or template matching Merge mode as shown in FIG. 6 is selected. In the pattern-based MV derivation method, a new Motion Vector Predictor (MVP) called temporal derived MVP is derived by scanning all MVs in all reference pictures. For example, in order to derive a L0 temporal derived MVP, each L0 MV in L0 reference pictures is scaled to point to the current picture. The 4×4 block that pointed by this scaled MV in the current picture is a target current block. The MV is further scaled to point to a reference picture with a reference index equals to 0 in L0 for the target current block. The further scaled MV is stored in a L0 MV field for the target current block. FIG. 7 shows an example of deriving temporal derived MVPs. MVs in all 4×4 blocks in all reference pictures are scanned to generate temporal derived L0 and L1 MVPs of the current picture. For each MV, the MV is scaled to get a crossed block in the current picture, and then the scaled MVP is calculated and assigned to the crossed block.

Both bilateral matching Merge mode and template matching Merge mode consist of two-stage matching: the first stage is Prediction Unit level (PU-level) matching, and the second stage is sub-PU-level matching. In the PU-level matching, multiple initial MVs in L0 and L1 are selected respectively. These MVs includes MVs from Merge candidates (i.e., conventional Merge candidates such as these specified in the HEVC standard) and MVs from temporal derived MVPs. Two different staring MV sets are generated for two lists. For each MV in one list, a MV pair is generated by composing of this MV and the mirrored MV that is derived by scaling the MV to the other list. For each MV pair, two reference blocks are compensated by using this MV pair. The Sum of Absolutely Differences (SAD) of these two blocks is calculated. The MV pair with the smallest SAD is selected as the best MV pair. A diamond search is then performed to refine the MV pair. The refinement precision is ⅛-pel. The refinement search range is restricted within ±8 pixel. The final MV pair is the PU-level derived MV pair.

The sub-PU-level searching in the second stage of the PMVD method searches a best MV pair for each sub-PU. The current PU is divided into sub-PUs, where the depth of sub-PU (e.g. 3) is signaled in Sequence Parameter Set (SPS) with a minimum sub-PU size of 4×4 samples. Several starting MVs in List 0 and List 1 are selected for each sub-PU, which includes PU-level derived MV pair, zero MV, HEVC collocated TMVP of the current sub-PU and bottom-right block, temporal derived MVP of the current sub-PU, and MVs of left and above PUs or sub-PUs. By using the similar mechanism in PU-level searching, the best MV pair for each sub-PU is selected. The diamond search is then performed to refine the best MV pair. Motion compensation for each sub-PU is then performed to generate a predictor for each sub-PU.

For the bilateral matching merge mode as shown in FIG. 5, motion information for a current block 510 in a current picture is derived based on two reference pictures Ref 0 and Ref 1. Bilateral matching is applied when the motion vectors derived from Merge mode are bi-prediction pointing to two reference pictures with an equal distance from the current picture (i.e. temporal distances TD0=TD1). The motion information of the current block 510 is derived by searching the best match between two blocks 520 and 530 along the motion trajectory 540 of the current block in two different reference pictures Ref 0 and Ref 1. Under the assumption of continuous motion trajectory, the motion vector MV0 associated with Ref 0 and the motion vector MV1 associated with Ref 1 pointing to the two reference blocks shall be proportional to the temporal distances TD0 and TD1, between the current picture and the two reference pictures Ref 0 and Ref 1.

FIG. 6 illustrates an example of the template matching Merge mode. The reconstructed pixels of above four rows and left four columns of a current block are used to form a template, for example, the two neighboring areas 620a and 620b of the current block 610 in a current picture are used as the template for the current block 610. Template matching is performed to find the best matched template with its corresponding MV, for example, the best matched template 630a and 630b in a reference picture Ref 0 are found with its corresponding motion vector 640. In the PU-level matching of the two-stage matching, several starting MVs in List 0 and List 1 such as MVs from Merge candidates and MVs from temporal derived MVPs are selected. Two different starting MV sets are generated for two lists. For each MV in one list, the SAD cost of the template with the MV is calculated. The MV with the smallest SAD cost is the best MV. The diamond search is then performed to refine the best MV with a refinement precision of ⅛-pel, and restricted the refinement search range to be within ±1 pixel. The final MV is the PU-level derived MV. The MVs in List 0 and List 1 are generated independently. For the sub-PU-level searching, the current PU is divided into sub-PUs. For each sub-PU at left or top PU boundaries, several starting MVs in List 0 and List 1 are selected, and by using similar mechanism in PU-level searching, the best MV pair for each sub-PU at left or top PU boundaries is selected. The diamond search is performed to refine the MV pair. Motion compensation is performed to generate a predictor for each sub-PU according to the refined MV pair. For PUs that are not at left or top PU boundaries, the sub-PU-level searching is not applied, and the corresponding MVs are set equal to the MVs in the first stage. While the List 0 reference picture (Ref 0) is shown in FIG. 6, the List 1 reference picture (Ref 1) can also be used as a reference picture for template matching search.

In this decoder MV derivation method, template matching is also used to generate a MVP for Advanced Motion Vector Prediction (AMVP) mode coding. Template matching is performed to find a best template on a selected reference picture, and its corresponding MV is the derived MVP. This derived MVP is then inserted into a first position in an AMVP candidate list.

PMVD is not restricted to the above descriptions, any inter mode tool using pattern-based refinement of the PMVD behavior can also be denoted as PMVD or FRUC mode. One embodiment of PMVD mode signals a PMVD Merge index to the decoder to indicate which Merge candidate is selected for MV refinement, whereas in an original version of PMVD, the decoder tries all Merge candidates to find a best starting MV. In one embodiment, steps for sub-PU refinement are skipped for template matching in the PMVD coding tool, however, sub-PU refinement is performed for bilateral matching in the PMVD coding tool. In another embodiment of PMVD mode, sub-PU refinement is also not performed for bilateral matching, that is there is only the first stage of PU-level matching is performed for both bilateral and template matching in the PMVD coding tool.

Bilateral Matching based DMVR An implementation of DMVR replaces bilateral template generation with a bilateral matching method based on the PMVD bilateral matching mode. An example of bilateral based DMVR is described in document JVET-K0217, proposed in the 11$^{th}$ Meeting of Joint Video Experts Team (JVET) of ITU-T SG 16 WP3 and ISO/IEC JTC 1/SC 29/WG 11 in Ljubljana, SI, at 10-18 Jul. 2018. In another document JVET-M0029, bilateral based DMVR is further simplified to reduce the required computation complexity. One simplification uses block-based refinement instead of CU-based refinement. A CU with a size equal to M×N samples is partitioned into several units with a size equal to min (M, 16)× min (N, 16), where min (x, y) represents a minimum value between x and y. Each unit in the CU is refined independently.

VVC based DMVR In order to increase the accuracy of motion vectors of the Merge mode, a bilateral matching based decoder side motion vector refinement was proposed in the VVC standard. To encode or decode a block by a bi-prediction operation, a refined MV is searched around initial MVs in the reference picture list L0 and reference picture list L1. A distortion between two candidate blocks in the reference picture list L0 and list L1 is calculated. An example of decoder side motion vector refinement is shown in FIG. 8. A Sum of Absolute Difference (SAD) between reference blocks 844 and 864 based on a MV candidate around initial MVs is calculated. The MV candidate with a lowest SAD becomes the refined MV and is used to generate bi-predicted signal. DMVR is applied to a CU in a current picture when this CU is coded in CU level Merge mode with bi-prediction MVs, where the MVs pointing to one reference picture in the past and one reference picture in the future with respect to the current picture, distances between each reference picture and the current picture are the same, and this CU has more than 64 luma samples with a CU height more than 8 luma samples. The refined MV derived by the DMVR process is used to generate inter prediction samples, and the refined MV is also used in the deblocking filter process and spatial motion vector prediction for future CU coding.

As shown in FIG. 8, search points are surrounding the starting MV and MV offsets of the search points from the starting MV obey the MV difference mirroring rule. In other words, any point with a candidate MV pair (MV0, MV1) checked by DMVR has to obey the following two equations.

$$MV0' = MV0 + \text{MV\_offset}$$
$$MV1' = MV1 - \text{MV\_offset}$$

where MV_offset represents a refinement offset between the starting MV and the refined MV in one of the reference pictures. In VVC Test Model 4 (VTM4), the refinement search range is two integer luma samples from the starting MV.

The searching procedure of the VVC based DMVR is illustrated in FIG. 9. The searching procedure includes an integer sample offset search stage 92 and a fractional sample refinement stage 94. To reduce the search complexity, a fast searching method with early termination mechanism is applied in the integer sample offset search stage 92. Instead of 25 points full search, a 2-iteration search scheme with reduced SAD checking points is applied. As shown in FIG. 10, a maximum of 6 SADs are checked in the first iteration. First, SADs of a center position and four neighboring positions P1~P4 are compared, and if the SAD of the center position is the smallest among the five SADs, the integer sample offset search stage 92 of DMVR is terminated. Otherwise, one more position is determined by the SAD distribution of the checked positions, for example, position P5 is determined and checked. The position among P1 to P5 with a smallest SAD is selected as a center position of the second iteration search. The process of the second iteration search is the same as that of the first iteration search. The SAD calculated in the first iteration may be reused in the second iteration. In VVC based DMVR, fractional sample refinement performed after integer sample search is derived using parametric error surface equation rather than SAD comparison in order to save the computational complexity. Fractional sample refinement is conditionally invoked based on the output of the integer sample search stage. In cases when the integer sample search stage is terminated by a center position having the smallest SAD in either the first or second iteration search, fractional sample refinement is applied. In parametric error surface based sub-pixel offset estimation, a center position cost and costs of four neighboring positions are used to fit a two-dimensional parabolic error surface equation as shown in the following:

$$E(x, y) = A(x - x_{min})^2 + B(y - y_{min})^2 + C$$

where $(x_{min}, Y_{min})$ corresponds to the fractional position with the least cost, and C corresponds to a minimum cost value. By solving the above equation using the cost value of the five search points, $(x_{min}, Y_{min})$ is computed as:

$$x_{min} = (E(-1, 0) - E(1, 0))/(2(E(-1, 0) + E(1, 0) - 2E(0, 0)))$$

$$y_{min} = (E(0, -1) - E(0, 1))/(2((E(0, -1) + E(0, 1) - 2E(0, 0)))$$

The value of $x_{min}$ and $Y_{min}$ are automatically constrained to be between −8 and 8 since all cost values are positive and the smallest value is E (0,0). This corresponds to half pixel offset with $\frac{1}{16}$th-pel MV accuracy in VTM4. The computed fractional $(x_{min}, Y_{min})$ are added to the integer distance refinement MV to get the sub-pixel accurate refinement delta MV.

Bilinear Interpolation and Sample Padding The resolution of the MVs is $\frac{1}{16}$ luma samples in the VVC standard. Samples at fractional positions are interpolated using an 8-tap interpolation filter. In DMVR, search points are surrounding the initial fractional-pel MV with an integer sample offset. These search points for the DMVR search process are generated by interpolation as these search points are located at fractional positions. In order to reduce the computational complexity, a bi-linear interpolation filter is used to generate the fractional samples for the DMVR search process. By using a bi-linear interpolation filter with 2-sample search range, DMVR does not access more reference samples compared to the normal motion compensation process. After the refined MV is attained with the DMVR search process, a normal 8-tap interpolation filter is applied to generate the final prediction. In order to restrict the number of reference samples accessed by the interpolation process for the refined MV to be not more than the number of reference samples accessed by the interpolation process for the original MV, any sample needed by the interpolation process for the refined MV will be padded from those available samples.

Maximum DMVR Processing Unit When one or both of the width and height of a CU is larger than 16 luma samples, the CU is further partitioned into sub-blocks with one or both of the width and height equal to 16 luma samples. The maximum processing unit size for the DMVR search process is limited to 16×16 samples.

VVC based AMVR In the HEVC standard, Motion Vector Differences (MVDs) between motion vectors and predicted motion vectors are signaled in units of quarter-luma-sample when the flag use_integer_mv_flag is equal to 0 in the slice header. In the VVC standard, a CU-level Adaptive Motion Vector Resolution (AMVR) scheme is introduced. AMVR allows a MVD of a CU to be coded in units of quarter-luma-sample, integer-luma-sample, or four-luma-sample. The CU-level MVD resolution indication is conditionally signaled if the current CU has at least one non-zero MVD component. If all MVD components are zero, that is both horizontal and vertical MVDs for reference list L0 and reference list L1 are zero, the quarter-luma-sample MVD resolution is inferred.

For a CU that has at least one non-zero MVD component, a first flag is signaled to indicate whether the quarter-luma-sample MVD precision is used for the CU. If the first flag is zero for a current CU, the quarter-luma-sample MVD precision is used for the current CU and no further signaling is needed. Otherwise, a second flag is signaled to indicate whether the integer-luma-sample or four-luma-sample MVD precision is used. In order to ensure the reconstructed MV has the intended precision, the motion vector predictors for the CU will be rounded to the same precision as that of the MVD before being added together with the corresponding MVD. The motion vector predictors are rounded toward zero, that is, a negative motion vector predictor is rounded toward positive infinity and a positive motion vector predictor is rounded toward negative infinity. The encoder determines the motion vector resolution for the current CU using rate distortion check. To avoid always performing CU-level rate distortion check three times for each MVD resolution, in VTM4, the rate distortion check of four-luma-sample MVD resolution is only invoked conditionally. The rate distortion cost of the quarter-luma-sample MVD precision is computed first, the rate distortion cost of the integer-luma sample MVD precision is then compared with that of the rate distortion cost of the quarter-luma-sample MVD precision. If the rate distortion cost for the quarter-luma-sample MVD precision is much smaller than that of the integer-luma-sample MVD precision, the rate distortion check of the four-luma-sample MVD precision is skipped.

Bi-Directional Optical Flow (BDOF) Bi-Directional Optical Flow (BDOF) achieves 4×4 sub-block level motion refinement through the assumptions of optical flow and steady motion of objects. BDOF is only applied to the luma component, and BDOF is applied to a CU if it satisfies the following three conditions. First, the CU height is not 4 and the CU size is not 4×8, second, the CU is not coded using affine mode or ATMVP Merge mode, third, the CU is a truly bi-directional predicted block. The truly bi-directional predicted blocks are blocks in a current picture predicted from two reference pictures, one reference picture is a previous picture and the other reference picture is a latter picture. A predictor of a bi-directional predicted block is derived by blending one List 0 predictor retrieved from a reference picture of List 0 and one List 1 predictor retrieved from a reference picture of List 1. FIG. 11 illustrates an example of applying BDOF to refine motion of a 4×4 sub-block in a bi-direction slice (B-slice). Each sample in the 4×4 sub-block is predicted by corresponding pixels in L0 and L1 reference pictures. For each 4×4 sub-block, a refined motion $(v_x, v_y)$ is calculated by minimizing the difference between L0 and L1 prediction samples. The refined motion is then used to adjust the bi-predicted sample values in the 4×4 sub-block. BDOF employs a 6×6 window to derive the motion refinement for each 4×4 sub-block, and the following steps are applied in the BDOF process.

First, the horizontal and vertical gradients, $$\frac{\partial I^{(k)}}{\partial x}(i, j)$$

and $$\frac{\partial I^{(k)}}{\partial y}(i, j),$$

where k=0, 1, of the two prediction signals are computed by directly calculating the difference between two neighboring samples.

$$\frac{\partial I^{(k)}}{\partial x}(i, j) = \left(I^{(k)}(i+1, j) - I^{(k)}(i-1, j)\right) \gg 4$$

$$\frac{\partial I^{(k)}}{\partial y}(i, j) = \left(I^{(k)}(i, j+1) - I^{(k)}(i, j-1)\right) \gg 4$$

11
12 where $I^{(k)}(i,j)$ are the sample value at coordinate $(i,j)$ of the prediction signal in list k, k=0,1. Then, the auto- and cross-correlation of the gradients, $S_1$, $S_2$, $S_3$, $S_5$ and $S_6$, are calculated as $$S_1 = \sum_{(i,j)\in\Omega} \psi_x(i,j)\cdot\psi_x(i,j),$$

$$S_3 = \sum_{(i,j)\in\Omega} \theta(i,j)\cdot\psi_x(i,j)$$

$$S_2 = \sum_{(i,j)\in\Omega} \psi_x(i,j)\cdot\psi_y(i,j)$$

$$S_5 = \sum_{(i,j)\in\Omega} \psi_y(i,j)\cdot\psi_y(i,j)$$

$$S_6 = \sum_{(i,j)\in\Omega} \theta(i,j)\cdot\psi_y(i,j)$$

where $$\psi_x(i,j) = \left(\frac{\partial I^{(1)}}{\partial x}(i,j) + \frac{\partial I^{(0)}}{\partial x}(i,j)\right) \gg n_a$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = \left(I^{(1)}(i,j) \gg n_b\right) - \left(I^{(0)}(i,j) \gg n_b\right)$$

where $\Omega$ is a 6×6 window around the 4×4 sub-block. The refined motion $(v_x, v_y)$ is then derived using the cross- and auto-correlation terms using the following equations:

$$v_x = S_1 > 0?\ clip3\left(-th'_{BIO}, th'_{BIO}, -((S_3\cdot 2^{n_b-n_a}) \gg \lfloor\log_2 S_1\rfloor)\right):0$$

$$v_y = S_5 > 0?\ clip3\left(-th'_{BIO}, th'_{BIO}, -\right.$$

$$\left.\left((S_6\cdot 2^{n_b-n_a} - ((v_x S_{2,m}) \ll n_{S_2} + v_x S_{2,s})/2) \gg \lfloor\log_2 S_5\rfloor\right)\right):0$$

where $S_{2,m}=S_2 \gg n_{S_2}$, $S_{2,s}=S_2 \& (2^{n_{S2}}-1)$, $th_{BIO}=2^{13-BD}$ and [·] is the floor function. Based on the motion refinement and the gradients, the following adjustment is calculated for each sample in the 4×4 sub-block:

$$b(x,y) = rnd\left(\left(v_x\left(\frac{\partial I^{(1)}(x,y)}{\partial x} - \frac{\partial I^{(0)}(x,y)}{\partial x}\right)\right)/2\right) +$$

$$rnd\left(\left(v_y\left(\frac{\partial I^{(1)}(x,y)}{\partial y} - \frac{\partial I^{(0)}(x,y)}{\partial y}\right)\right)/2\right)$$

Finally, the refined BDOF samples of the CU are calculated by adjusting the bi-prediction samples as follows:

$$pred_{BDOF}(x,y) = \left(I^{(0)}(x,y) + I^{(1)}(x,y) + b(x,y) + o_{offset}\right) \gg shift$$

In the above equations, the values of $n_a$, $n_b$, and $n_{S_2}$ are equal to 3, 6, and 12 respectively. These values are selected such that the multipliers in the BDOF process do not exceed 15 bits, and the maximum bit-width of the intermediate parameters in the BDOF process is kept within 32 bits.

In order to derive the gradient values, some prediction samples $I^{(k)}(i,j)$ in list k, where k is 0 or 1, outside of the current CU boundaries need to be generated. As depicted in FIG. 12, BDOF uses one extended row and column around the CU boundaries for interpolation. In order to control the computational complexity of generating the out-of-bound-ary prediction samples, a bilinear filer is used to generate prediction samples in the extended area, and a normal 8-tap motion compensation interpolation filter is used to generate prediction samples within the CU. These extended sample values are used in gradient calculation only. For the remaining steps in the BDOF process, if any sample and gradient values outside of the CU boundaries are needed, the sample are padded from the nearest neighbors.

In the block-based BDOF operation, two early termination processes are employed to reduce the computational complexity of the BDOF operation. A SAD between two predictors of a CU is first calculated, one predictor is from L0 and another predictor is from L1, and if the SAD between the two predictors is smaller than one threshold, the BDOF operation is skipped as the two predictors are good enough. Otherwise, the BDOF operation is applied to the CU. When the BDOF operation is applied to a current CU, the BDOF operation is selectively applied to each 4×4 block according to a SAD between two predictors of each 4×4 block. The BDOF operation is skipped when a SAD between two predictors in a current 4×4 block is smaller than a threshold.

BRIEF SUMMARY OF THE INVENTION

Exemplary methods of video processing in a video coding system perform bi-directional motion compensation to encode or decode video blocks. An exemplary video processing method receives input video data associated with a current block in a current picture, splits the current block into sub-partitions, obtains a reference block for each sub-partition in the current block from one or more reference pictures according to an initial MV, and derives a refined MV for each sub-partition by performing motion refinement on each sub-partition. The video processing method further comprises padding one or more boundary pixels of the reference block for each sub-partition, performing motion compensation for each sub-partition according to the refined MV to generate a final predictor for the current block, and encoding or decoding the current block according to the final predictor. Motion refinement is performed by searching around the initial MV with N-pixel refinement.

In an exemplary embodiment of the video processing method, the video processing method further comprises checking if a size, width, or height of the current block is larger than or equal to a threshold, and partitioning the current block into sub-partitions when the size, width, or height of the current block is larger than or equal to the threshold. For example, the threshold is 16×16, 16×8, 8×16, 8 or 16. For example, the current block is partitioned into 16×16 sub-partitions when the size of the current block is larger than 16×16 or when the width or height is larger than 16. In another example, the current block is partitioned into sub-partitions having 16×8 or 8×16 samples when the width or height of the current block is larger than or equal to 8.

A size of the reference block for each sub-partition is (W+7)×(H+7) samples when a size of each sub-partition is W×H samples. In some embodiments, motion refinement includes an integer search with up to 2-pixel refinement in horizontal and vertical directions.

In some embodiments, padding one or more boundary pixels of the reference block for a sub-partition is only performed when there is any pixel needed for motion compensation of the sub-partition using the refined MV is outside the reference block. In some embodiments, the padding operation extends the reference block of each sub-partition by repeating top, bottom, left, and right boundary pixels of the reference block. The refined MV for each sub-partition of the current block is derived by an integer search followed by a fractional sample refinement. In one embodiment, an 8-connected search pattern is used in the integer search of motion refinement. The 8-connected search pattern checks eight connected integer positions related to a central position, the eight connected integer positions are left, top, right, bottom, left-top, right-top, left-bottom, and right-bottom neighboring positions of the central position. In some embodiments, the fractional sample refinement is derived using a parametric error surface operation, and a center position cost and costs of four neighboring positions are used to fit a two-dimensional parabolic error surface equation. To reduce the complexity of the system, the parametric error surface operation is disabled when a later BDOF operation is enabled. In one embodiment, a 2-pixel-distance MV change is employed for one search iteration in the integer search of motion refinement.

In some exemplary embodiments of the video processing method, a search region number N for motion refinement is determined according to a size of the current block, or a frame resolution of the current picture. For example, a larger block is assigned with a larger search region number for motion refinement. The reference block for each sub-partition may be obtained by interpolating the reference picture pixels into fractional position pixels if the initial MV has a fractional part. In another embodiment, the reference block for each sub-partition is obtained by directly using original integer pixels of the reference pictures, and a parametric error surface operation is employed to decide a fractional pixel refinement. For example, the initial MV is rounded to a nearest integer MV, and the rounded MV is used to derive the reference block for each sub-partition by directly using the original integer pixels.

In some embodiments, motion refinement is skipped for the current block if an initial Sum of Absolute Difference (SAD) of an initial matching position is larger than a pre-defined threshold. In some other embodiments, a later BDOF operation is disabled if a MV difference between the initial MV and the refined MV is larger than a threshold.

Aspects of the disclosure further provide embodiments of apparatuses for processing video data in a video coding system. An embodiment of the apparatuses comprises one or more electronic circuits configured for receiving input data of a current block in a current picture, partitioning the current block into sub-partitions, obtaining a reference block for each sub-partition from one or more reference pictures according to an initial MV, deriving a refined MV for each sub-partition of the current block for performing motion refinement on each sub-partition, for motion compensation of a sub-partition using the refined MV, padding one or more boundary pixels of the reference block for the sub-partition, performing motion compensation for each sub-partition according to the refined MV to generate a final predictor for the current block, and encoding or decoding the current block according to the final predictor. Motion refinement is performed by searching around the initial MV with N-pixel refinement, for example N is 2.

Aspects of the disclosure further provide a non-transitory computer readable medium storing program instructions for causing a processing circuit of an apparatus to perform a video processing method to encode or decode a current block coded or to be coded in inter prediction with motion refinement. After performing motion refinement to sub-partitions of the current block, a padding operation is performed on each sub-partition to extend the reference block of the sub-partition needed for motion compensation. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein:

FIG. 15 is a flowchart shows an exemplary embodiment of the present invention for processing a current block with motion refinement.

DETAILED DESCRIPTION OF THE INVENTION

Figure 16:
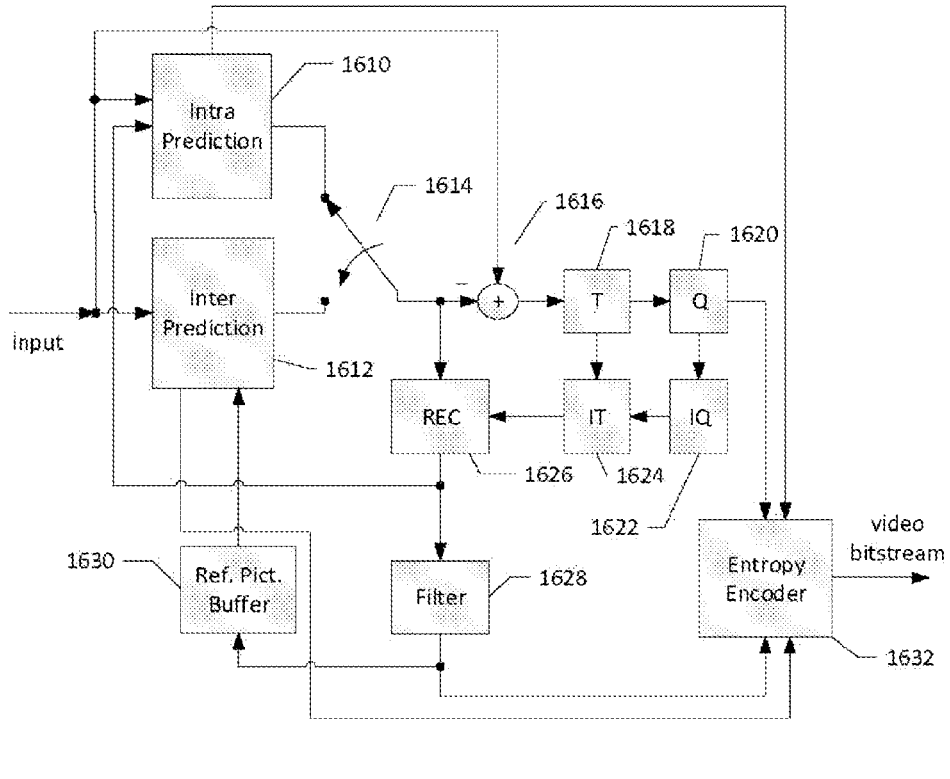
FIG. 16 illustrates an exemplary system block diagram for a video encoding system incorporating the video processing method according to embodiments of the present invention.
Figure 17:
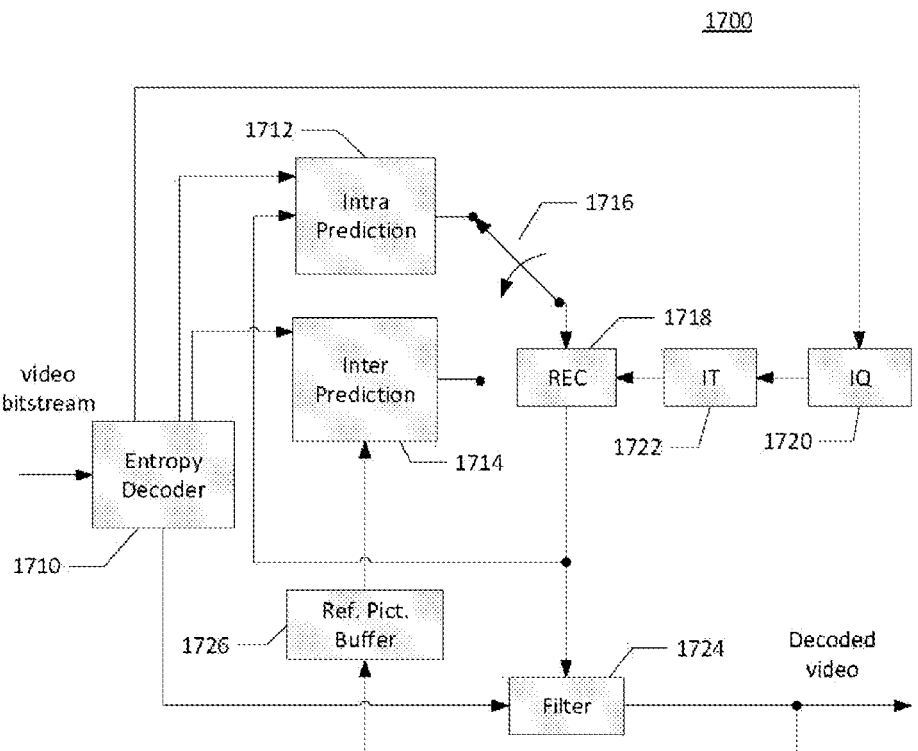
FIG. 17 illustrates an exemplary system block diagram for a video decoding system incorporating the video processing method according to embodiments of the present invention.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. In this disclosure, systems and methods are described for processing bi-direction predicted block with motion refinement coding tools, where each or a combination of the methods may be implemented in a video encoder or video decoder. An exemplary video encoder and decoder implementing one or a combination of the methods are illustrated in FIG. 16 and FIG. 17 respectively. Various embodiments in the disclosure reduce the computation complexity of implementing motion refinement coding tools. Systems and methods described herein are organized in sections as follows.

Figure 1:
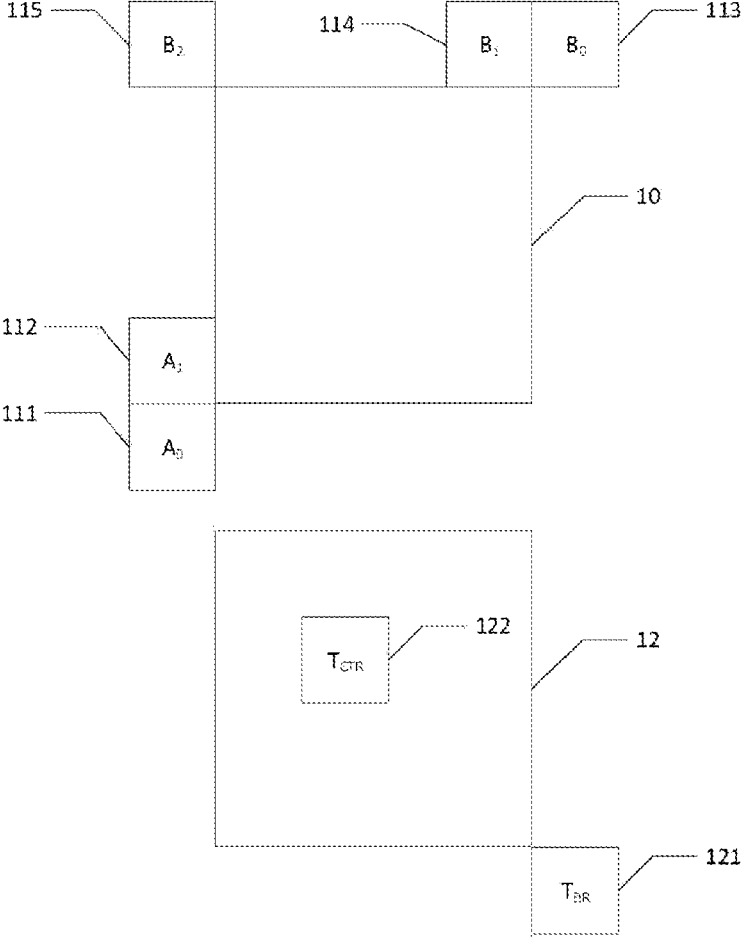
FIG. 1 illustrates locations of spatial motion candidates and temporal motion candidate for constructing a Merge candidate lists defined in the HEVC standard.
Figure 2:
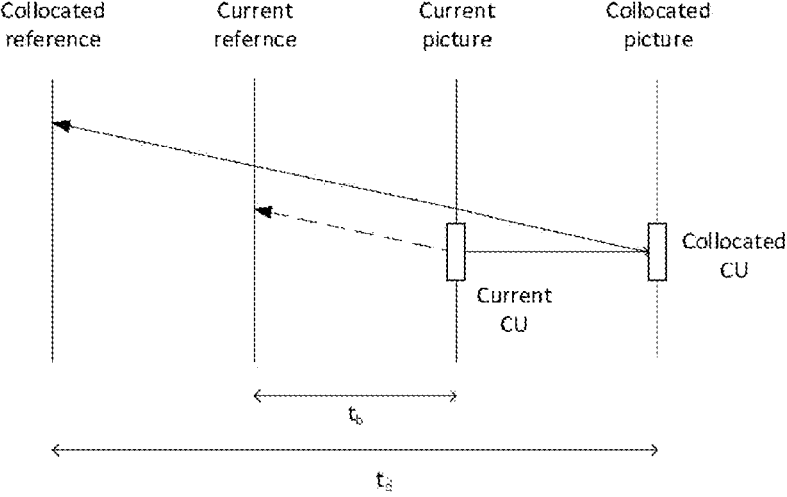
FIG. 2 illustrates generation of a scaled MV for a temporal Merge candidate.
Figure 3:
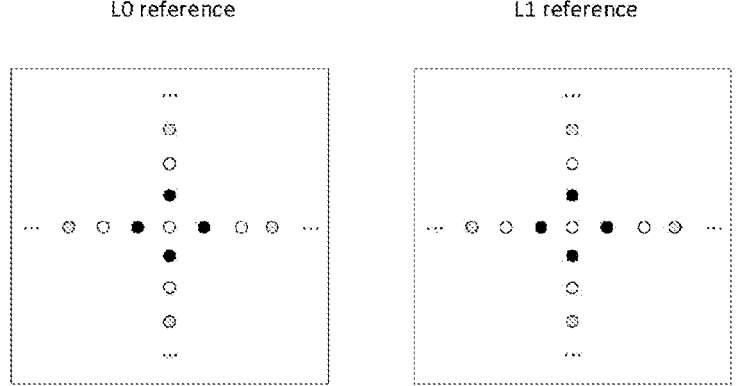
FIG. 3 illustrates search points for Merge Mode with MVD (MMVD) in List 0 reference block and List 1 reference block.
Figure 4:
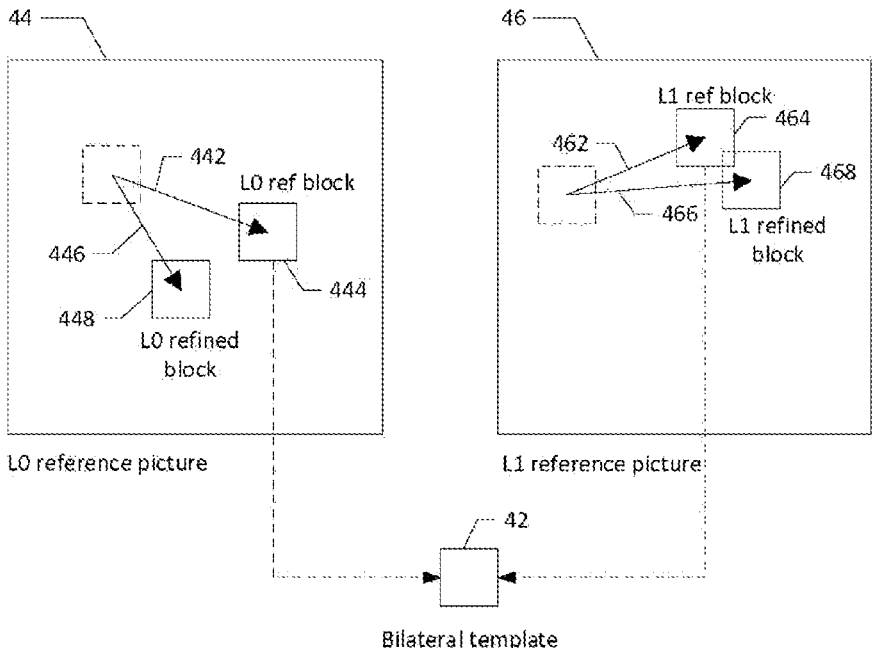
FIG. 4 illustrates the concept of bilateral template MV refinement.
Figure 5:
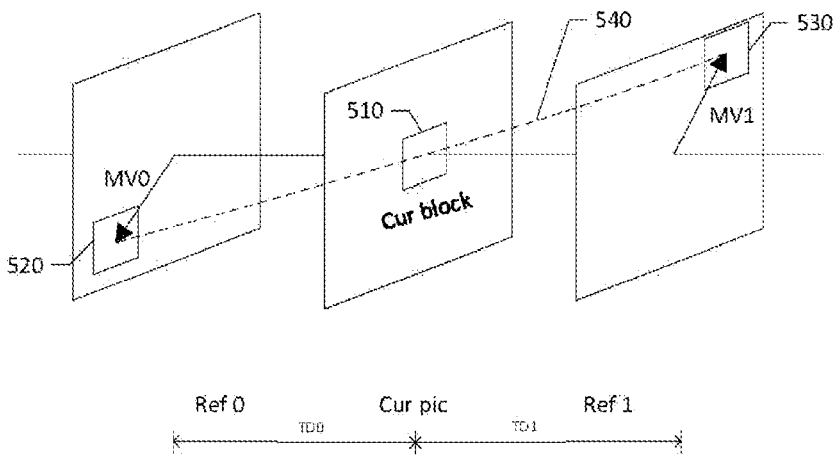
FIG. 5 illustrates an example of applying bilateral matching for a current block in a current picture to search for reference blocks in two equal-distance reference pictures.
Figure 6:
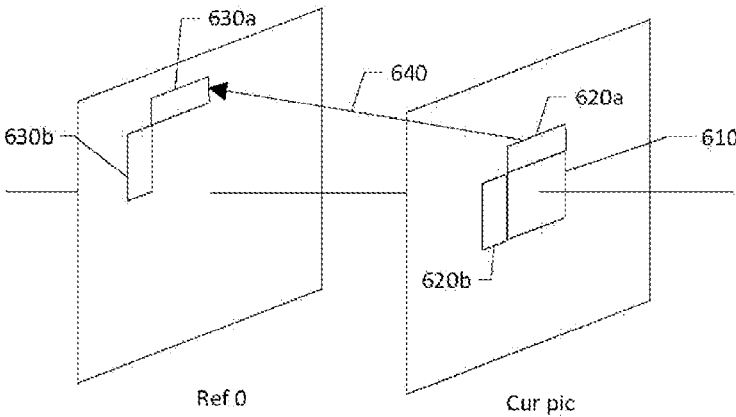
FIG. 6 illustrates an example of applying template matching for a current block in a current picture to search for a MV pointing to a reference block with best matched templates.
Figure 7:
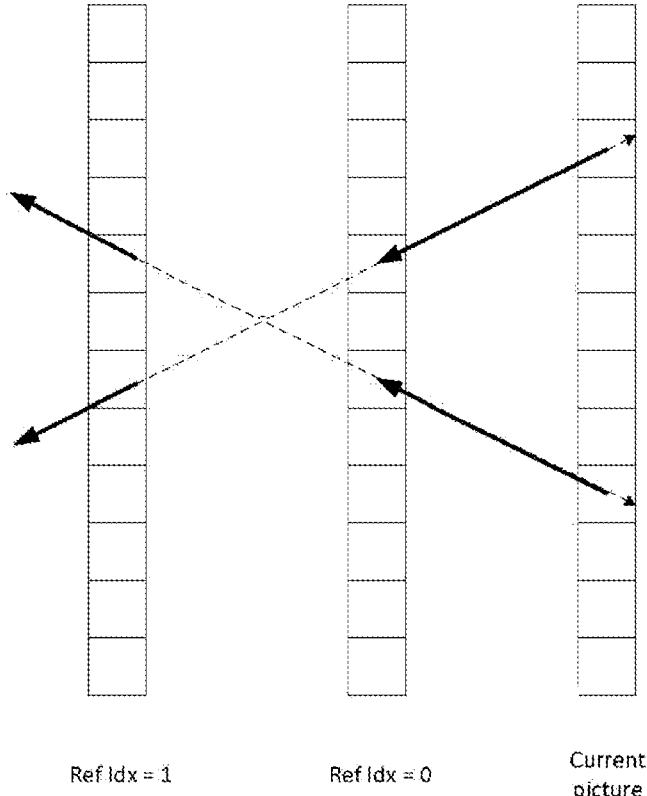
FIG. 7 illustrates the concept of temporal derived MVPs in the pattern-based MV derivation method.
Figure 8:
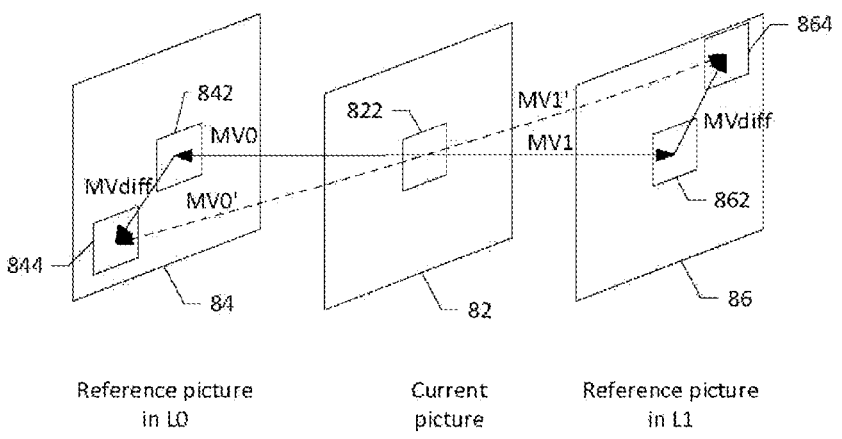
FIG. 8 illustrates the concept of Decoding side Motion Vector Refinement (DMVR) for refining an initial MV.
Figure 9:
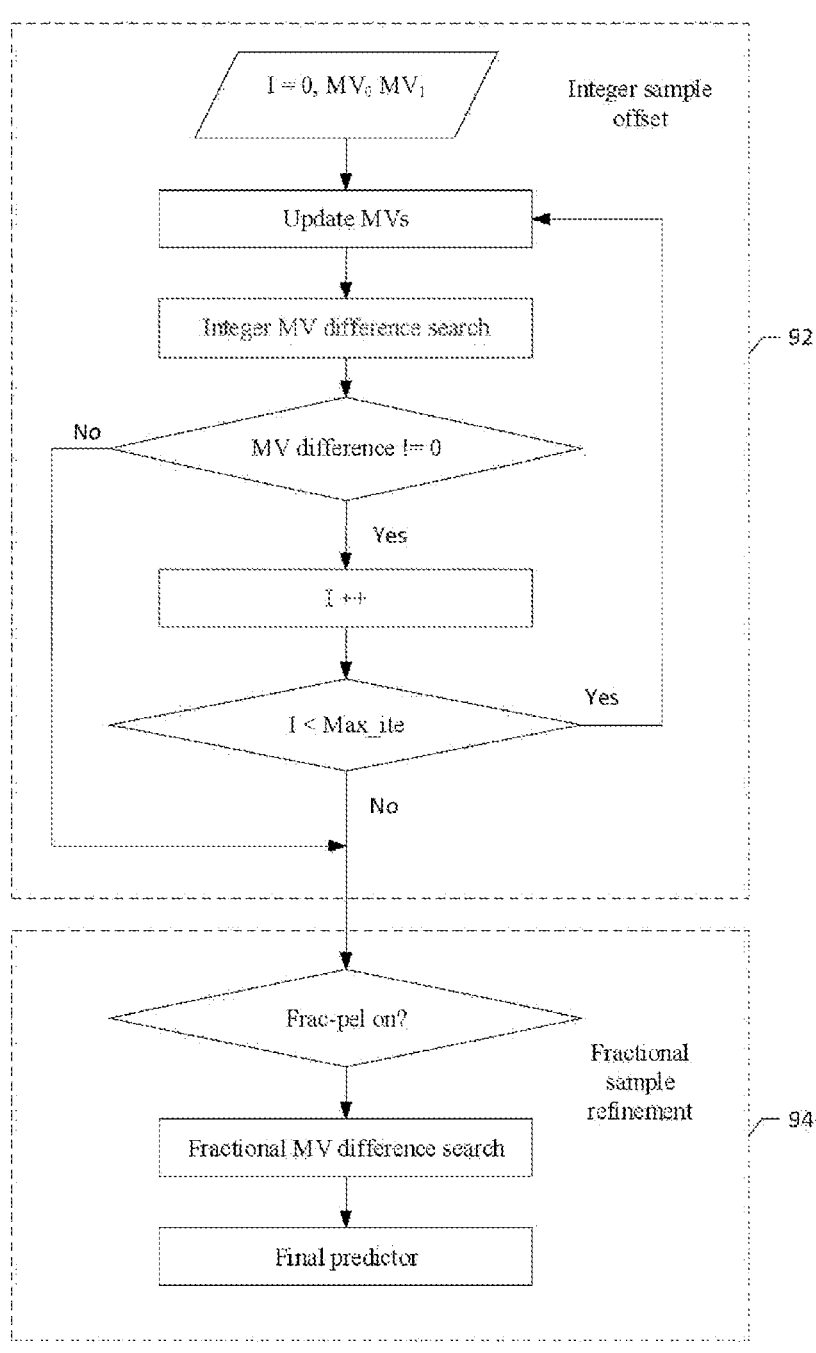
FIG. 9 illustrates a DMVR operation including an integer sample offset search stage and a fractional sample refinement stage.
Figure 10:
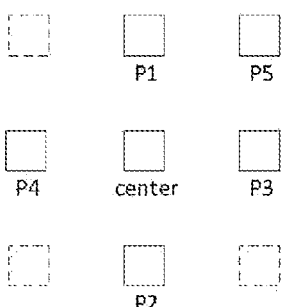
FIG. 10 illustrates an example of the DMVR integer luma sample searching pattern.
Figure 11:
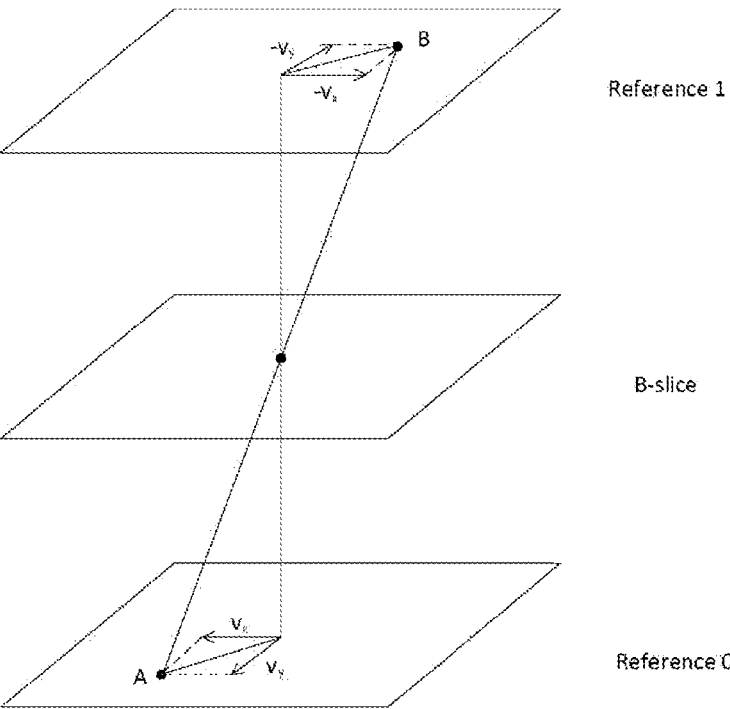
FIG. 11 illustrates an example of applying Bi-Directional Optical Flow (BDOF) for sample refinement.
Figure 12:
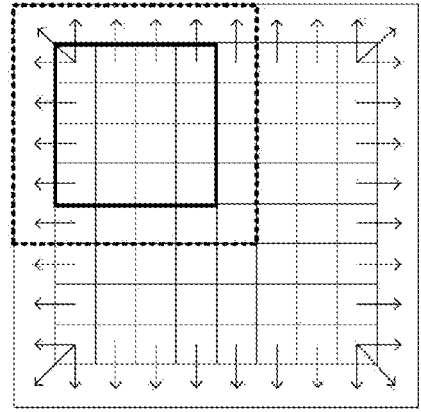
FIG. 12 demonstrates an extended CU region of a current CU used in the BDOF operation.
Figure 13:
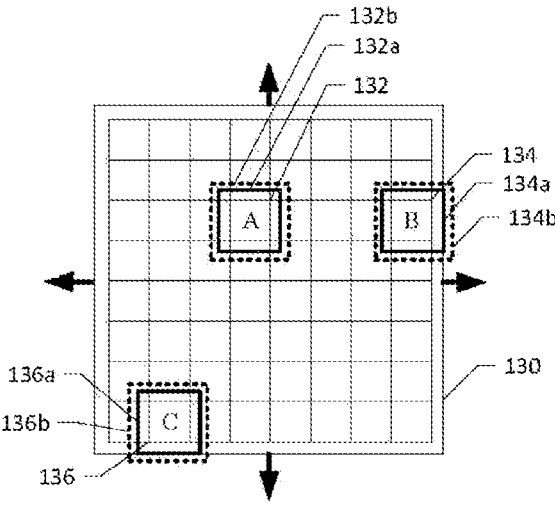
FIG. 13 illustrates an example of CU base reference sample padding which causes irregularity between sub-partitions.

Padding on Sub-partition Base in DMVR The VVC based Decoder Motion Vector Refinement (DMVR) operation partitions a CU into sub-partitions if a size, width, or height of the CU is larger than or larger than or equal to a threshold, and the DMVR operation is applied to each sub-partition independently. For example, the size of sub-partitions is 16×16, and the threshold for the width or height is 16 or the threshold for the size is 256 samples. In another example, the threshold for the size is set to be 128 samples, and a CU is partitioned into 8×16, or 16×8, or 16×16 sub-partitions. The threshold for the width or height may be 8 or 16 samples. For a sub-partition with a width W and a height H, a number of reference samples required for generating motion compensation reference block of the sub-partition is (W+7)×(H+7). A bi-linear interpolation filter is used to generate fractional samples for the searching process in DMVR from the retrieved (W+7)×(H+7) reference samples of each sub-partition. The generated fractional samples are referred to as a sub-partition reference block for Motion Compensation (MC), and the sub-partition reference block contains (W+7)×(H+7) samples. After the refined MV is attained with the DMVR search process, a normal 8-tap interpolation filter is applied to generate the final MC predictor. The refined MV is used for MC and for generating Temporal Motion Vector Predictors (TMVPs). In previous implementations, after DMVR refinement, padding around a CU for the MC 8-tap interpolation filter is performed on CU base. FIG. 12 illustrates CU-wise sample padding for motion compensation reference samples generation. In FIG. 12, the size of a current CU is 128×128, and the size of a reference block 130 fetched for the current CU is 135×135. The current CU is split into sixty-four 16×16 sub-partitions for motion refinement in DMVR. The size of each sub-partition is 16×16 samples, and a reference block for each sub-partition contains (16+7)×(16+7) samples. In FIG.-13, the sub-partition reference blocks 132a, 134a, and 136a of sub-partitions A, B, and C 132, 134, and 136 are depicted by solid lines around the corresponding sub-partitions, and since an integer search with ±N pixel refinement is employed in DMVR, reference areas 132b, 134b, and 136b with a size equal to (16+7+2N)×(16+7+2N) needed after DMVR refinement are depicted by dashed lines around the corresponding search ranges. After motion refinement by DMVR, for a current sub-partition not located at the CU boundary, such as sub-partition A 132, a reference area 132b needed for motion compensation is retrieved from the reference block 130 without a padding operation. However, for a current sub-partition located at the CU boundary, such as sub-partition B 134 and sub-partition C 136, padded pixels derived from one or more CU boundaries may be used for motion compensation. For example, some pixels at the right boundary of the reference area 134b needed for motion compensation of sub-partition B 134 are outside the reference block 130, thus these unavailable pixels are generated by a padding operation. Some pixels at the bottom boundary of the reference area 136b needed for motion compensation of sub-partition C 136 are also outside the reference block 130, thus these unavailable pixels are generated by a padding operation. In short, as shown in FIG. 13, there is irregularly between the padding operations for different sub-partitions in the current CU, which increase the design complexity.

Figure 14:
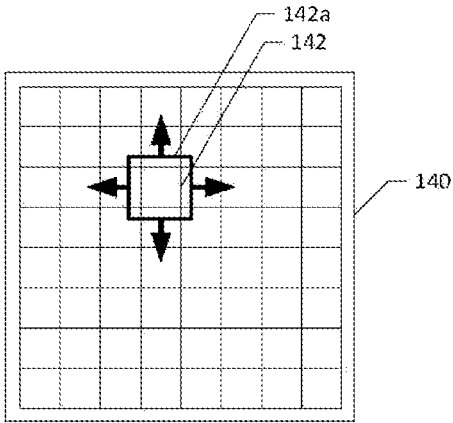
FIG. 14 illustrates an example of sub-partition base reference sample padding according to an embodiment of the present invention.

Exemplary embodiments of the present invention perform padding around the sub-partition reference block of each sub-partition, which means padding is on sub-partition base instead of CU base. The major benefits of sub-partition base padding over CU base padding include reducing the padding irregularity between sub-partitions and reducing the memory bandwidth or internal storage for the DMVR operation. By implementing an embodiment of the present invention, hardware design for DMVR is more regular and simpler than conventional DMVR hardware design. In some embodiments, after motion refinement of each sub-partition by DMVR, unavailable pixels required by the 8-tap interpolation filter in motion compensation are padded around the sub-partition reference block of the sub-partition. For example, if any top, left, bottom, or right neighboring sample of a sub-partition reference block is needed for motion compensation, this sample is padded by a boundary pixel of the sub-partition reference block. FIG. 14 illustrates an example of sub-partition base padding according to an embodiment of the present invention. In this example, a current CU with a size of 128×128 samples is partitioned into several sub-partitions each with a size 16×16 samples. A reference block 140 for the current CU is obtained from a reference picture according to an initial MV truncated to an integer position. A sub-partition reference block 142a inside the reference block 140 is obtained for a sub-partition 142, where the size of the sub-partition reference block 142a is (16+7)×(16+7) samples. DMVR employs an integer search with ±N pixel refinement, after performing DMVR on the sub-partition 142, some pixels required for motion compensation of the sub-partition 142 may be located outside the fetched sub-partition reference block 142a. Any pixel required for motion compensation outside the sub-partition reference block 142a is generated by padding.

In one specific embodiment, a current CU is split into sub-partitions each with a size of 16×16 samples. For each sub-partition, 23×23 reference samples are retrieved from a reference picture according to an initial MV, and a bi-linear interpolation filter is used to generate a sub-partition reference block with 23×23 samples for each sub-partition. DMVR employs an integer search with ±N pixel refinement, the top, bottom, left, and right boundaries of the sub-partition reference block are padded by N pixels during the integer search. For example, the integer search in DMVR may refine the motion vector by 2 pixels in each direction. After DMVR refinement, if any pixel required by the 8-tap interpolation filter lies outside the original fetched 23×23 reference samples, padded pixels are used for motion compensation to generate the final predictor.

Embodiments of the present invention generate padded pixels for motion compensation filtering for each sub-partition, which extends the sub-partition reference block of each sub-partition by repeating top, bottom, left, and right boundary pixels of the sub-partition reference block. Corner pixels outside the sub-partition reference block of a sub-partition repeat corresponding corner pixels inside the sub-partition reference block of the sub-partition. The padding operation for generating the final predictor of a CU is done for each sub-partition of the CU. The padding operation is similar to the conventional VVC based DMVR padding operation, except a padding procedure is unified and applied on every sub-partition instead of on every CU.

Representative Flowchart of Exemplary Embodiments FIG. 15 shows a flowchart illustrating a video processing method encoding or decoding a current block with motion refinement according to exemplary embodiments of the present invention. A video encoding system or a video decoding system receives input data associated with a current block coded or to be coded in inter prediction in step S1502. A DMVR operation is applied to the current block in steps S1504, S1506, and S1508 for motion refinement. The current block is partitioned into sub-partitions in step S1504 as the DMVR operation is independently applied on each sub-partition. A reference block is obtained for each sub-partition in the current block from reference pictures according to an initial MV in step S1506. For example, a (W+7)× (H+7) reference block is fetched for each W×H sub-partition. The DMVR operation derives a refine MV for each sub-partition, and the DMVR operation performs motion refinement by searching around the initial MV with N-pixel refinement in step S1508. For example, up to 2 pixels refinement in each direction is allowed in the DMVR operation. After the DMVR operation, a padding operation is applied around the reference block of each sub-partition for generating pixels for motion compensation in step S1510. In an embodiment, the video encoding system or video decoding system may check if any pixel needed for motion compensation is outside the reference block (i.e., pixel needed is unavailable in current reference block), and generates padded pixels if some pixels needed for motion compensation are located outside the reference block. In step S1510, the padding operation is applied for the each sub-partition by repeating boundary pixels of the reference block of the sub-partition. Motion compensation for each sub-partition is performed according to the refined MV of each sub-partition to generate a final predictor for the current block in step S1512. In step S1514, the current block is encoded or decoded according to the final predictor.

Padding on Sub-partition Base for BDOF The VVC BDOF includes a padding technique to generate padding pixels outside the CU boundary to make outside-CU-boundary pixels available. In an embodiment of the present invention, a padding technique with sub-block base padding is employed in the BDOF operation. For example, when the BDOF operation is applied to each 8×8 sub-partition of a current CU, that is, the operation unit for BDOF is 8×8 pixels, a padding technique is used to generate padding pixels for the boundary of each 8×8 sub-partition. In another embodiment, the boundary for padding is not necessary equal to the boundary of the operation unit, and the boundary for padding is related to a needed range for the operation unit for BDOF. For example, a 9×9 needed range is employed for each 8×8 BDOF operation unit, so the padding area is 9×9 pixels. In other words, the padding operation may be based on the operation unit of BDOF, for example, doing BDOF for each 4×4 sub-partition, and the operation unit is 4×4; or the padding operation may be related to the operation unit of BDOF, for example, doing BDOF for each 4×4 sub-partition, it needs 5×5 region, and the padding area is 5×5 pixels.

8-Connected Search Pattern In one embodiment of DMVR integer search, an 8-connected search for one integer search run is used instead of the cross-like search pattern. The cross-like search pattern used in the VVC based DMVR integer search checks cross-4-positions of a central position. One integer search run is equal to one iteration of search. The 8-connected search is performed for each sub-partition in a CU for motion refinement. The 8-connected search checks eight connected integer positions related to a central position including left, top, right, bottom, left-top, right-top, left-bottom, and right-bottom neighboring positions of the central position. In an alternative embodiment of DMVR integer search, a 7-connected search is used for one integer search run. The 7-connected search checks cross-4-positions and 3 corner positions related to a central position. In another alternative embodiment of DMVR integer search, a 6-connected search is used for one integer search run where the 6-connected search checks cross-4-positions and 2 corner positions related to a central position.

Adaptively Enable Parametric Error Surface Stage of DMVR In VVC based DMVR, parametric error surface equations are used in the fractional sample refinement stage to reduce the computational complexity of DMVR. A BDOF operation is performed after the DMVR operation to further refine the motion of bi-predicted blocks. Refined MVs generated from the DMVR operation is the input for the BDOF operation. The BDOF operation may be enabled or disabled, and an embodiment of the present invention disables the parametric error surface stage of DMVR if the later BDOF operation is enabled. In another embodiment, the parametric error surface stage of DMVR is always disabled.

2-pixel-distance Search in Integer Search Stage of DMVR In VVC based DMVR, a 1-pixel-distance MV change is employed for one integer search iteration. An embodiment of the present invention refines 2-pixel-distance MV change for 1 integer search iteration. For each integer search iteration, the searched position has 2-pixel-distance in horizontal direction or vertical direction between the refined position and current central position. For example, each integer search checks positions at x+2-integer-distance, x−2-integer-distance, y+2-integer-distance, and y−2-integer-distance. In general, embodiments of the present invention perform M-pixel-distance MV change for one integer search iteration in DMVR, where M is greater than or equal to 2. In another embodiment, only one integer search iteration is performed instead of VVC based DMVR with two integer search iteration. In another embodiment, after the M-pixel-distance integer search, the parametric error surface operation is modified to use an M-pixel-distance integer SAD result to estimate the parametric-error-surface MV refinement result. The parametric-error-surface algorithm may receive the M-pixel-distance integer search SAD results to estimate the MV further refinement amount, and the result will need to multiply by M and added to the final MVD change as the input of the parametric-error-surface algorithm is M-pel distance based value. For example, by using 2-pixel-distance integer search in DMVR, 2 pixel-distance SAD results for surrounding positions are obtained, and if the parametric-error-surface algorithm needs to refine x-direction MV by x_frac (between 0~1), y-direction MV by y_frac (between 0~1), the final refined MVD is integer_MVD+(x_frac*2, y_frac*2). The above various embodiments may be combined.

Parametric-error-surface Support for Best-SAD-not-central Case The VVC based DMVR executes the parametric-error-surface operation only when the best SAD of the previous integer search iteration is the central position, which is the original starting position. In an embodiment of the present invention, the parametric-error-surface operation is also performed for cases when the best SAD of the previous integer search iteration is not the central position. The previous integer search iteration checks top, left, bottom, right positions, and one corner position related to the original central position, by implementing the embodiment of supporting parametric-error-surface for best-SAD-not-central case, some SAD results may be reused. For example, the SAD results of the top, central and bottom positions from the previous integer search iteration can be reused to estimate the vertical fractional part if the best SAD of the previous integer search iteration is the right position. Similarly, the SAD results of the top, central, and bottom positions from the previous integer search iteration can be reused to estimate the vertical fractional part if the best SAD of the previous integer search iteration is the left position. The SAD results of the left, central and right positions from the previous integer search iteration can be reused to estimate the horizontal fractional part if the best SAD of the previous integer search iteration is the top or bottom position.

In another embodiment, two corner positions and previous best edge position are used to estimate for parametric-error-surface when the 8-connected based integer search is employed in DMVR. The two corner positions are the corner positions nearest to the previous best edge position, where the best edge position means one of the top, bottom, left, and right positions associated with the best SAD in the previous integer iteration.

Large Search Region and Adaptive Search Region for Different CU In VVC based DMVR, The Search Region (SR) number is equal to two, which includes searching two pixels to the left, two pixels to the right, two pixels to the bottom, and two pixels to the top. The SR number is fixed to be two for all CU sizes. An embodiment of the present invention employs different SR numbers for different CU sizes. In another embodiment, different SR numbers are used for different frame resolutions. In yet another embodiment, the SR number is adaptively controlled. For example, a larger SR number is applied to larger MV magnitude. In another example, a larger SR number is applied to larger CUs.

Low-delay-B Support for DMVR with MVD-mirror-like Algorithm The VVC based DMVR has no effect for low-delay-B (LDB) cases as DMVR only activates on true-bi-predication Merge candidates. An embodiment of the present invention uses a modified MVD mirrored algorithm to support LDB cases for DMVR. The modified MVD mirrored algorithm is similar to the original MVD mirrored algorithm in the VVC based DMVR. In the original MVD mirrored algorithm, the modified MV in List 0 is equal to the original candidate MVL0 plus the searched MVD, and the modified MV in List 1 is equal to the original candidate MVL1 minus the searched MVD. In the modified MVD mirrored algorithm, any non-true-bi-prediction Merge candidate in the LDB cases is derived by: the modified MV in List 0 is equal to the original candidate MVL0 plus the searched MVD, and the modified MV in List 1 is equal to the original candidate MVL1 plus the searched MVD multiplied by a variable alpha. Alpha is equal to a ratio of POC distance of List 0 and List 1, the POC distance of List 0 is the picture POC distance of the current picture to the List 0 reference picture, and the POC distance of List 1 is the picture POC distance of the current picture to the List 1 reference picture.

Before searching, a simple filtering operation such as bilinear filtering used in the VVC based DMVR, is employed to obtain a search region of List 0. For the search region of List 1, an interpolation filter is used to get the search region of List 1, the distance between two integer positions on the search region of List 1 is alpha times of 1 pixel distance. For example, if alpha is 0.5, the distance between two integer positions on the search region of List 1 is 0.5 integer pixel distance on the actual reference picture.

In another embodiment, the alpha rule is reversed, so the modified MV in List 0 is equal to the original candidate MVL0 plus the searched MVD multiplied by alpha, and the modified MV in List 1 is equal to the original candidate MVL1 plus the search MVD. In one embodiment, the SR of List 0 and List 1 can be different, if List 1 POC distance is larger than List 0 POC distance, the SR on List 1 can be larger than the SR on List 0, such that each "1 integer step" in List 0 means "larger than 1 integer step" in List 1 when performing SAD matching.

Low-delay-B Support for DMVR with FRUC Bilateral Algorithm To support low-delay-B (LDB) cases for DMVR, in one embodiment, FRUC (PMVD) bilateral based algorithm is used to support the MV refinement for LDB case.

Only Integer Pixel Matching for SAD The VVC based DMVR uses two iterations of integer search followed by a parametric-error-surface fractional MV search. The search region of the integer search in the VVC based DMVR is obtained by interpolating the reference picture pixels into fractional position pixels if the original MV has a fractional part. Some embodiments of the present invention skip interpolating the reference picture pixels for deriving the search region as it always directly uses the original integer pixels of the reference picture to build the search region. The integer position search is performed on the search region derived by the original integer pixels, and then the parametric-error-surface operation is employed to decide the fractional pixel refinement. In one embodiment, in order to use the original integer pixels of the reference picture to build the search region, the original Merge candidate MV is rounded to the nearest integer MV, and the rounded MV is used to derive the search region. In one embodiment, if the parametric-error-surface operation is not activated after integer position search, for example, the parametric-error-surface operation is disabled when the best SAD is not associated with the central position, the integer search MVD is added back to the original MV, where the fractional part MV keeps unchanged.

MV Copying for Partitioned Process for DMVR The VVC based DMVR has a partitioned process behavior as it partitions a CU into several sub-partitions and motion refinement of DMVR is performed on each sub-partition. An embodiment of the present invention conducts a fast algorithm by skipping motion refinement for some sub-partitions. The fast algorithm performs motion refinement only for predefined or selected sub-partitions, and any sub-partition other than the pre-defined or selected sub-partitions (i.e. skipped sub-partition) directly uses the neighboring sub-partition motion refinement result(s). For example, all even-column sub-partitions are skipped and the motion refinement is performed only on odd-column sub-partitions. If a current CU is partitioned into M row and N columns of sub-partitions, the even-column of the sub-partitions means the sub-partitions of even horizontal offset. The refined MVs of the odd-column sub-partitions are directly copied as the refined MV of the even-column sub-partitions.

In another embodiment, a skipped sub-partition derives a motion refinement result directly uses the neighboring sub-partition motion refinement result(s) also including deriving a motion refinement result based on the refined MV of surrounding neighboring sub-partitions, for example, using an average algorithm. In another embodiment, for each sub-partition with K*W pixels, a sub-sampling operation is performed to sub-sample each sub-partition into K/2*W/2 pixels, and the DMVR refinement operation is performed only on the sub-sampled sub-partitions. To be more general, a sub-sampling operation is performed on each sub-partition with K*W pixels to generate sub-sampled sub-partitions each with K/A*L/B pixels, and the DMVR refinement operation is performed on the sub-sampled sub-partitions, where A and B are positive integers.

Supporting Non-equal-distance for Bilateral DMVR The VVC based DMVR only activates when POC distances of List 0 and List 1 are equal, where the POC distance of List 0 is the POC difference between the current picture and the List 0 reference picture and the POC distance of List 1 is the POC difference between the current picture and the List 1 reference picture. Embodiments of the present invention support non-equal-distance true bi-prediction Merge candidate. A modified MVD mirrored algorithm is similar to the original MVD mirrored algorithm in the VVC based DMVR. In the original MVD mirrored algorithm, the modified MV in List 0 is equal to the original candidate MVL0 plus the searched MVD, and the modified MV in List 1 is equal to the original candidate MVL1 minus the searched MVD. In the modified MVD mirrored algorithm, the modified MV in List 0 is equal to the original candidate MVL0 plus the searched MVD, and the modified MV in List 1 is equal to the original candidate MVL1 minus the searched MVD multiplies by a variable alpha. Alpha is equal to a ratio of the POC distances of List 0 and List 1 reference pictures.

Before the integer search stage in DMVR, a simple filtering such as a bilinear filtering is employed to derive the search region of List 0. The search region of List 1 is derived by interpolation, where the distance between two integer positions on the search region of List 1 is alpha times of 1 pixel distance. For example, if alpha is equal to 0.5, the distance between two integer positions on the search region of List 1 is 0.5 times the integer pixels distance on the actual reference picture. In another embodiment, the alpha rule can be reversed, such that the modified MV in List 0 is equal to the original candidate MVL0 plus the search MVD multiplies by alpha, and the modified MV in List 1 is equal to the original candidate MVL1 minus the search MVD.

In one embodiment, the search region of List 0 is different from the search region of List 1, for example, if the List 1 POC distance is larger than the List 0 POC distance, the search region on List 1 is bigger than the search region on the List 0, such that each "1 integer step" in List 0 means "larger than 1 integer step" in List 1 during SAD matching. In another embodiment, if the List 0 POC distance is larger than the List 1 POC distance, the search region on List 0 is bigger than the search region on List 1, such that each "1 integer step" in List 1 means "larger than 1 integer step" in List 0 during SAD matching.

Parametric-error-surface for AMVR MV In some embodiments, a parametric-error-surface algorithm is used to derive estimated fractional MV results for AMVR. The AMVR has 4-pel-unit MVD, 1-pel-unit MVD, or 2-pel-unit MVD, the parametric-error-surface algorithm is applied for AMVR. For example, AMVR has the MV result of 4-pel unit, and the parametric-error-surface algorithm is applied in AMVR to derive the fractional MV part.

Early Skip by Large Initial SAD Value In the VVC based DMVR operation, the DMVR operation is early skipped if an initial SAD of an initial matching position is smaller than a pre-defined threshold. In some embodiments, the DMVR operation is early skipped if an initial SAD of an initial matching position is larger than a pre-defined threshold.

Fast DMVR Encoder Algorithm In some embodiments, in order to support MMVD in the DMVR operation, one fast algorithm is employed to only perform the DMVR operation to large-distance candidates in MMVD candidates. A large-distance candidate is a MMVD candidate with a larger MVD.

Partial Selection of DMVR Candidates In some embodiments of the present invention, a pre-defined rule is employed to select some of the Merge candidates for DMVR refinement, so the DMVR operation is implicitly turned off for unselected Merge candidates. In one embodiment, the pre-defined rule selects even Merge candidates, such as candidate 0, 2, 4, and so on, for DMVR refinement. In one embodiment, the pre-defined rule selects odd Merge candidates, such as candidate 1, 3, 5, and so on, for DMVR refinement. In another embodiment, the pre-defined rule selects non-spatial Merge candidates for DMVR refinement. In yet another embodiment, the MV diversity of corner spatial neighboring MVs of a current CU is first computed, and the DMVR operation is disabled for the current CU if the MV diversity is small.

Disable BDOF for Large MVD Modification In one embodiment, if DMVR search results show large MVD modification after performing the DMVR operation, a later BDOF operation is turned off. For example, the BDOF operation is disabled when a MV difference between the initial MV and the refined MV is larger than a threshold.

Reorder MMVD Candidate According to DMVR Matching In some embodiments, SAD matching is performed on each MMVD candidate, and SAD matching has MVD-mirrored behavior is similar to the DMVR operation. The MMVD candidates in the Merge candidate list are reordered according to the SAD matching results.

Simplification of DMVR There are three techniques that could be used to simplify the DMVR operation. The first technique is associated with the DMVR search pattern. In an embodiment, the DMVR search pattern is changed to full search in one iteration, so a total of 25 positions will be searched and 25 cost values will be compared. In another embodiment, the DMVR search pattern is changed to 9-points for each iteration, for example, the 9 points include the center position and the 8-connected positions. In yet another embodiment, the DMVR search pattern is changed to 9 points for one iteration. A general case of the first technique is changing the DMVR search pattern to M-points in 1 iteration or every iteration. In the first technique, simplification of the DMVR operation is achieved by restricting the search range of DMVR.

In an embodiment of a second technique, final Motion Compensation (MC) for DMVR is removed, however, the search region is generated by an 8-tap conventional MC filter. In another embodiment of the second technique, final MC is changed to a bilinear filter and the search range keeps unchanged.

A third simplification technique is associated with the fractional search operation in DMVR. The third technique removes the parametric error surface operation in the VVC base DMVR.

Some embodiments combine two or more described simplification techniques. In one embodiment, the final motion compensation for DMVR is removed and the search range is generated by an 8-tap conventional MC filter, the DMVR search pattern is changed to 9-points for each iteration, and the parametric error surface operation is removed from the DMVR operation. In another embodiment, the final motion compensation for DMVR is removed and the search range is generated by an 8-tap conventional MC filter, the DMVR search pattern is changed to full search in one iteration, and the parametric error surface operation is removed from the DMVR operation. In one embodiment, the final motion compensation for DMVR is changed to bilinear filter and the search region is kept unchanged, the DMVR search pattern is changed to 9-points for each iteration, and the parametric error surface operation is removed from the DMVR operation. In another embodiment, the final motion compensation for DMVR is changed to bilinear filter and the search region is kept unchanged, the DMVR search pattern is changed to full search in one iteration, and the parametric error surface operation is removed from the DMVR operation. In one embodiment of combining the first and third techniques, the DMVR search pattern is changed to full search in one iteration, and the parametric error surface operation is removed from the DMVR operation. In another embodiment of combining the first and third techniques, the DMVR is changed to 9-points search for each iteration, and the parametric error surface operation is removed.

Video Encoder and Decoder Implementations The foregoing proposed video coding methods can be implemented in video encoders or decoders. For example, a proposed video processing method is implemented in an inter prediction module of an encoder, and/or inter prediction module of a decoder. In another example, a proposed video processing method is implemented in a motion compensation module of an encoder, and/or a motion compensation module of a decoder. Alternatively, any of the proposed methods can be implemented as a circuit coupled to the inter prediction or motion compensation module of the encoder and/or the inter prediction module or motion compensation module of the decoder, so as to provide the information needed by the inter prediction module or the motion compensation module.

FIG. 16 illustrates an exemplary system block diagram for a Video Encoder 1600 implementing various embodiments of the present invention. Intra Prediction module 1610 provides intra predictors based on reconstructed video data of a current picture. Inter Prediction module 1612 performs Motion Estimation (ME) and Motion Compensation (MC) to provide inter predictors based on video data from other picture or pictures. To encode a current block by bi-directional prediction according to some embodiments of the present invention, Inter Prediction module 1612 first determines a List 0 reference block by performing motion estimation and motion compensation from a List 0 reference picture and determines a List 1 reference block by performing motion estimation and motion compensation from a List 1 reference picture. The current block is divided into sub-partitions for motion refinement. List 0 and List 1 reference blocks of each sub-partition are refined by searching around the List 0 and List 1 reference blocks with N-pixel refinement. A refined MV is derived for each sub-partition, and if there is any pixel needed for motion compensation of each sub-partition outside the reference block of the sub-partition, padding pixels are generated using boundary pixels of the reference block of the sub-partition. The Inter Prediction module 1612 performs motion compensation for each sub-partition according to the refined MV to generate a final inter predictor for the current block.

Either Intra Prediction module 1610 or Inter Prediction module 1612 supplies the selected predictor to Adder 1616 to form prediction errors, also called prediction residual. The prediction residual of the current block are further processed by Transformation module (T) 1618 followed by Quantization module (Q) 1620. The transformed and quantized residual signal is then encoded by Entropy Encoder 1632 to form a video bitstream. Motion information of the final inter predictor of the current block are also encoded by Entropy Encoder 1632. The video bitstream is then packed with side information. The transformed and quantized residual signal of the current block is processed by Inverse Quantization module (IQ) 1622 and Inverse Transformation module (IT) 1624 to recover the prediction residual. As shown in FIG. 16, the prediction residual is recovered by adding back to the selected predictor at Reconstruction module (REC) 1626 to produce reconstructed video data. The reconstructed video data may be stored in Reference Picture Buffer (Ref. Pict. Buffer) 1630 and used for prediction of other pictures. The reconstructed video data recovered from REC 1626 may be subject to various impairments due to encoding processing; consequently, In-loop Processing Filter 1628 is applied to the reconstructed video data before storing in the Reference Picture Buffer 1630 to further enhance picture quality.

A corresponding Video Decoder 1700 for decoding the video bitstream generated from the Video Encoder 1600 of FIG. 16 is shown in FIG. 17. The video bitstream is the input to Video Decoder 1700 and is decoded by Entropy Decoder 1710 to parse and recover the transformed and quantized residual signal and other system information. The decoding process of Decoder 1700 is similar to the reconstruction loop at Encoder 1600, except Decoder 1700 only requires motion compensation prediction in Inter Prediction module 1714. Each block is decoded by either Intra Prediction module 1712 or Inter Prediction module 1714. Switch 1716 selects an intra predictor from Intra Prediction module 1712 or an inter predictor from Inter Prediction 1714 according to decoded mode information. To decode a current block coded in bi-directional prediction, Inter Prediction module 1714 determines a List 0 reference block by performing motion compensation from a List 0 reference picture and determines a List 1 reference block by performing motion compensation from a List 1 reference picture according to an initial MV. The current block is first divided into sub-partitions for motion refinement. Inter Prediction module 1714 performs a motion refinement by searching around the initial MV with N pixel refinement to derive a refined MV for each sub-partition. After the motion refinement, in cases when one or more pixels are needed for deriving a final predictor for each sub-partition, a padding operation is performed to generate padded pixels for each sub-partition. In other words, the padding operation is performed on a sub-partition base instead of CU base. A final inter predictor for the current block is then derived according to the refined MV. The transformed and quantized residual signal associated with the current block is recovered by Inverse Quantization module (IQ) 1720 and Inverse Transformation module (IT) 1722. The recovered residual signal of the current block is reconstructed by adding back the final inter predictor in Reconstruction module (REC) 1718 to produce reconstructed video. The reconstructed video is further processed by In-loop Processing Filter (Filter) 1724 to generate final decoded video. If the currently decoded picture is a reference picture for later pictures in decoding order, the reconstructed video of the currently decoded picture is also stored in Ref. Pict. Buffer 1726.

Various components of Video Encoder 1600 and Video Decoder 1700 in FIG. 16 and FIG. 17 may be implemented by hardware components, one or more processors configured to execute program instructions stored in a memory, or a combination of hardware and processor. For example, a processor executes program instructions to control receiving of input data associated with a current block in a current picture. The processor is equipped with a single or multiple processing cores. In some examples, the processor executes program instructions to perform functions in some components in Encoder 1600 and Decoder 1700, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 16 and 17, Encoder 1600 and Decoder 1700 may be implemented in the same electronic device, so various functional components of Encoder 1600 and Decoder 1700 may be shared or reused if implemented in the same electronic device.

Embodiments of the video processing method for encoding or decoding bi-directional predicted blocks with motion refinement and sub-partition base padding may be implemented in a circuit integrated into a video compression chip or program codes integrated into video compression software to perform the processing described above. For examples, the padding operation for generating motion compensation predictors may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video coding system, comprising:
receiving input data associated with a current block in a current picture;
partitioning the current block into sub-partitions;
for each sub-partition in the current block:
obtaining a reference block from one or more reference pictures according to an initial Motion Vector (MV);
deriving a refined MV according to decoder motion vector refinement (DMVR) by performing motion refinement on each sub-partition by searching around the initial MV with N-pixel refinement; and
padding one or more boundary pixels of the reference block, wherein the padding is performed on boundary pixels of a sub-partition of the reference block, the padding performed on a sub-partition basis and surrounding the sub-partition;

performing motion compensations for the sub-partitions in the current block according to the refined MVs to generate a final predictor for the current block; and
encoding or decoding the current block according to the final predictor.

2. The method of claim 1, further comprising checking if a size, width, or height of the current block is larger than or equal to a threshold, and partitioning the current block into sub-partitions when the size, width, or height of the current block is larger than or equal to the threshold.

3. The method of claim 2, wherein the threshold is 16×16, 16×8, 8×16, 8 or 16, and a size of each sub-partition split from the current block is 16×16, 16×8, or 8×16 samples.

4. The method of claim 1, wherein a size of each sub-partition is W×H samples and a size of the reference block for each sub-partition is (W+7)×(H+7) samples.

5. The method of claim 1, wherein the motion refinement applied to each sub-partition includes an integer search with up to 2-pixel refinement in horizontal and vertical directions.

6. The method of claim 1, wherein padding comprises extending the reference block for each sub-partition by repeating top, bottom, left, and right boundary pixels of the reference block.

7. The method of claim 1, wherein deriving the refined MV comprises applying an integer search followed by a fractional sample refinement.

8. The method of claim 7, wherein an 8-connected search pattern is used in the integer search, and the 8-connected search pattern checks eight connected integer positions related to a central position including left, top, right, bottom, left-top, right-top, left-bottom, and right-bottom neighboring positions of the central position.

9. The method of claim 7, wherein the fractional sample refinement is derived using a parametric error surface operation, and a center position cost and costs of four neighboring positions are used to fit a two-dimensional parabolic error surface equation.

10. The method of claim 9, wherein the parametric error surface operation is disabled when a later Bi-directional Optical Flow (BDOF) operation is enabled.

11. The method of claim 7, wherein applying the integer search comprises employing a 2-pixel-distance MV change for one search iteration in the integer search.

12. The method of claim 1, wherein performing motion refinement comprises determining a search region number N according to a size of the current block, or a frame resolution of the current picture.

13. The method of claim 1, wherein obtaining the reference block for each sub-partition comprises interpolating the reference picture pixels into fractional position pixels if the initial MV has a fractional part.

14. The method of claim 1, wherein obtaining the reference block for each sub-partition comprises directly using original integer pixels of the one or more reference pictures, and a parametric error surface operation is employed to decide a fractional pixel refinement.

15. The method of claim 14, wherein the initial MV is rounded to a nearest integer MV, and the rounded MV is used to derive the reference block for each sub-partition.

16. The method of claim 1, wherein padding one or more boundary pixels of the reference block for each sub-partition in the current block is only performed if any pixel needed for motion compensation of the sub-partition using the refined MV is outside the reference block.

17. The method of claim 1, wherein performing motion refinement comprises performing only on one or more pre-defined or selected sub-partitions, a sub-partition other than the pre-defined or selected sub-partitions directly uses a neighboring sub-partition motion refinement result.

18. The method of claim 1, wherein motion refinement is skipped for the current block if an initial Sum of Absolute Difference (SAD) of an initial matching position is larger than a pre-defined threshold.

19. The method of claim 1, further comprising disabling a later Bi-directional Optical Flow (BDOF) operation if a MV difference between the initial MV and the refined MV is larger than a threshold.

20. An apparatus of processing video data in a video coding system, the apparatus comprising one or more electronic circuits configured for:

receiving input data associated with a current block in a current picture;

partitioning the current block into sub-partitions;

for each sub-partition in the current block:

obtaining a reference block from one or more reference pictures according to an initial Motion Vector (MV);

deriving a refined MV according to decoder motion vector refinement (DMVR) by performing motion refinement on each sub-partition by searching around the initial MV with N-pixel refinement; and padding one or more boundary pixels of the reference block, wherein the padding is performed on boundary pixels of a sub-partition of the reference block, the padding performed on a sub-partition basis and surrounding the sub-partition;

performing motion compensation for the sub-partitions in the current block according to the refined MVs to generate a final predictor for the current block; and encoding or decoding the current block according to the final predictor.

21. A non-transitory computer readable medium storing program instruction causing a processing circuit of an apparatus to perform a video processing method for video data, and the method comprising:

receiving input data associated with a current block in a current picture;

partitioning the current block into sub-partitions;

for each sub-partition in the current block:

obtaining a reference block from one or more reference pictures according to an initial Motion Vector (MV);

deriving a refined MV according to decoder motion vector refinement (DMVR) by performing motion refinement on each sub-partition by searching around the initial MV with N-pixel refinement;

padding one or more boundary pixels of the reference block, wherein the padding is performed on boundary pixels of a sub-partition of the reference block, the padding performed on a sub-partition basis and surrounding the sub-partition;

performing motion compensation for the sub-partitions of the current block according to the refined MVs to generate a final predictor for the current block; and encoding or decoding the current block according to the final predictor.

* * * * *